(12) United States Patent
Aoki

(10) Patent No.: US 7,317,873 B2
(45) Date of Patent: Jan. 8, 2008

(54) OPTICAL PACKET SWITCHING SYSTEM

(75) Inventor: Yasuhiko Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 377 days.

(21) Appl. No.: 11/185,949

(22) Filed: Jul. 21, 2005

(65) Prior Publication Data
US 2006/0222361 A1 Oct. 5, 2006

(30) Foreign Application Priority Data
Mar. 29, 2005 (JP) ............................. 2005-093469

(51) Int. Cl.
*H04J 14/00* (2006.01)
(52) U.S. Cl. ............................. 398/45; 398/46; 398/47; 398/48; 398/55
(58) Field of Classification Search ............. 398/45–57
See application file for complete search history.

(56) References Cited

U.S. PATENT DOCUMENTS 6,005,698 A * 12/1999 Huber et al. .................. 398/50
6,657,780 B2 * 12/2003 Choa ........................... 359/349
6,714,740 B2 * 3/2004 Tajima ......................... 398/31
7,010,226 B2 * 3/2006 Le Sauze et al. ............. 398/49
2004/0223762 A1 * 11/2004 Lee et al. ..................... 398/51

FOREIGN PATENT DOCUMENTS

JP 2000-077769 3/2000

* cited by examiner

*Primary Examiner*—Dalzid Singh
(74) *Attorney, Agent, or Firm*—Staas & Halsey LLP

(57) ABSTRACT

An optical packet switching system in which transmission quality, reliability, and system management in optical packet switching control are improved. An optical packet switch section includes semiconductor optical amplifiers as gate switches multistage-connected on paths along which optical packets sent from a plurality of input line cards are transmitted and performs optical packet switching by broadcasting the optical packets to a plurality of gate switches, by selecting the optical packets by ON/OFF gating operation of the gate switches, and by absorbing noise signals which flow along non-selected paths by putting gate switches at a final stage into the OFF state. A switch control section exercises ON/OFF drive control over the gate switches in the optical packet switch section on the basis of port connection requests from the plurality of input line cards so as to generate requested paths.

17 Claims, 29 Drawing Sheets

T1 PORT CONNECTION INFORMATION TABLE

|  | SESSION Se1 | SESSION Se2 | SESSION Se3 |
|---|---|---|---|
| INPUT PORT #1 | OUTPUT PORT #2 (OPTICAL PACKET P11) × | OUTPUT PORT #1 (OPTICAL PACKET P21) × | OUTPUT PORT #2 (OPTICAL PACKET P31) × |
| INPUT PORT #2 | OUTPUT PORT #3 (OPTICAL PACKET P12) × | OUTPUT PORT #2 (OPTICAL PACKET P22) | OUTPUT PORT #3 (OPTICAL PACKET P32) × |
| INPUT PORT #3 | OUTPUT PORT #1 (OPTICAL PACKET P13) | OUTPUT PORT #3 (OPTICAL PACKET P23) | OUTPUT PORT #1 (OPTICAL PACKET P33) |

FIG. 17

T2 FAULT LOCATION TABLE

| | STATE ST1 ⇨ | STATE ST2 ⇨ | STATE ST3 ⇨ | STATE ST4 ⇨ | STATE ST5 ⇨ |
|---|---|---|---|---|---|
| M1 MONITORED CONTROL INFORMATION PATH STATE ON INPUT LINE CARD SIDE | ○ | ○ | ○ | × | ○ |
| M2 MONITORED RECEIVING SECTION STATE | ○ | ○ | ○ | × | × |
| M3 MONITORED SENDING SECTION STATE | ○ | × | ○ | ○ | ○ |
| M4 MONITORED CONTROL INFORMATION PATH STATE ON OUTPUT LINE CARD SIDE | ○ | ○ | × | ○ | ○ |
| A DECISION | SOA FAULT LOCATION PROCESS | SOA FAULT LOCATION PROCESS | DISCONNECTION OF OPTICAL FIBER F2 | DISCONNECTION OF OPTICAL FIBER F1 | FAULT IN INPUT LINE CARD 10 |

FIG. 21

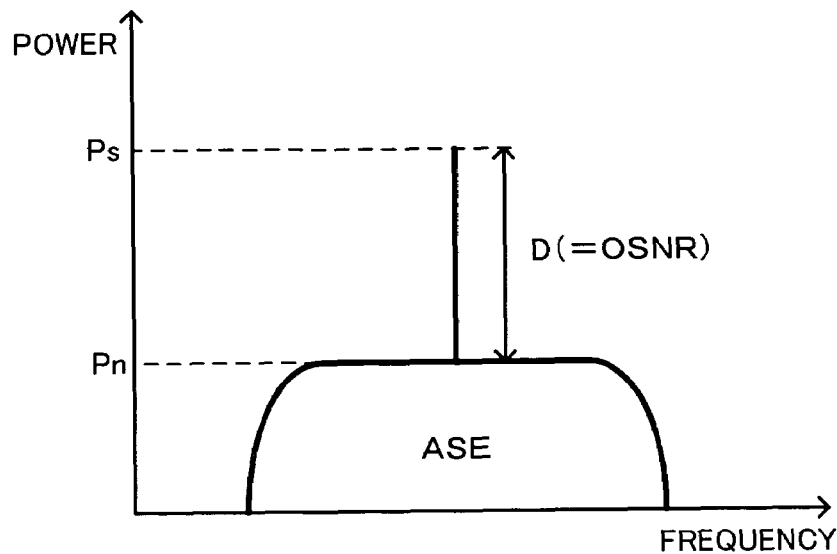
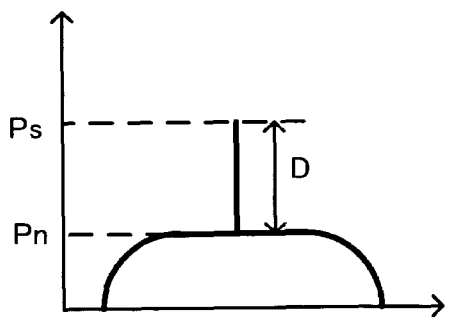
BRANCH LOSS IS SMALL AND ACCUMULATED NOISE IS LOW. THEREFORE, D IS GREATER THAN OR EQUAL TO A CERTAIN VALUE.
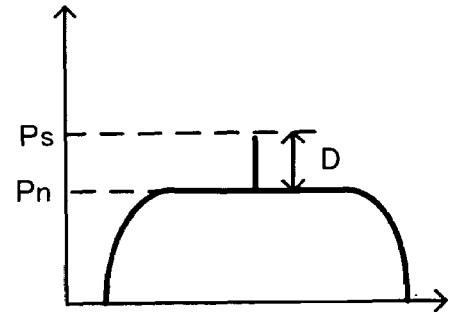
BRANCH LOSS IS LARGE AND ACCUMULATED NOISE IS HIGH. THEREFORE, D IS SMALLER THAN THE CERTAIN VALUE.
FIG. 28
PRIOR ART

OPTICAL PACKET SWITCHING SYSTEM

CROSS-REFERENCE TO RELATED APPLICATIONS

This application is based upon and claims the benefits of priority from the prior Japanese Patent Application No. 2005-093469, filed on Mar. 29, 2005, the entire contents of which are incorporated herein by reference.

BACKGROUND OF THE INVENTION (1) Field of the Invention

This invention relates to an optical packet switching system and, more particularly, to an optical packet switching system for performing optical packet transmission.

(2) Description of the Related Art

With an increase in demand for communication by broadband services, in recent years long-distance large-capacity optical communication networks have appeared and development of high-speed large-capacity wavelength division multiplexing (WDM), in which a plurality of optical signals with different wavelengths are multiplexed into a single optical fiber, have advanced.

In addition, with the rapid spread of the Internet and an increase in the number of large-capacity contents, there have been demands for more high-speed large-capacity flexible optical communication networks. Accordingly, attention has been paid to optical packet switching as a technique for building such optical communication networks.

The optical packet switching is a technique for switching transmitted information as packets in a completely optical state. Compared with the conventional switching in which optical signals are temporarily converted into electrical signals, processing speeds are not limited by electronic processing but by light propagation delay time. Therefore, high-speed large-capacity transmission can be performed.

FIG. 24 shows a conventional switching system in which electrical switching is performed. A switching system 100 comprises input line cards 101-1 through 101-*n*, an electrical switch core section 102, and output line cards 103-1 through 103-*n*.

The input line card 101-1 includes an optical/electrical converter (O/E) 101*a* and an electrical/optical converter (E/O) 101*b*. The same applies to the input line cards 101-2 through 101-*n*. The electrical switch core section 102 includes O/E's 102*a*-1 through 102*a*-*n*, an electrical switch 102*b*, and E/O's 102*c*-1 through 102*c*-*n*. The output line card 103-1 includes an O/E 103*a* and an E/O 103*b*. The same applies to the output line cards 103-2 through 103-*n*.

When optical signals reach the input line cards 101-1 through 101-*n*, they are converted into electrical signals by the O/E's 101*a* and processes, such as address detection, are performed by, for example, processors. The electrical signals are converted again into optical signals by the E/O's 101*b* and are outputted to the electrical switch core section 102.

The electrical switch core section 102 converts the input optical signals into electrical signals by the O/E's 102*a*-1 through 102*a*-*n*, performs electrical switching by the electrical switch 102*b*, and converts the electrical signals into optical signals by the E/O's 102*c*-1 through 102*c*-*n*. The output line cards 103-1 through 103-*n* convert the optical signals outputted from the electrical switch core section 102 into electrical signals by the O/E's 103*a*, convert the electrical signals into optical signals by the E/O's 103*b*, and output the optical signals onto transmission lines.

FIG. 25 shows an optical packet switching system. An optical packet switching system 100*a* comprises input line cards 101-1 through 101-*n*, an optical switch core section 104, and output line cards 103-1 through 103-*n*. The operation of the input line cards 101-1 through 101-*n* is the same as that of the input line cards 101-1 through 101-*n* shown in FIG. 24 and the operation of the output line cards 103-1 through 103-*n* is the same as that of the output line cards 103-1 through 103-*n* shown in FIG. 24. However, the optical switch core section 104 performs switching on optical signals (optical packets having a pulse width of about 100 ns, for example) outputted from the input line cards 101-1 through 101-*n* without converting them into electrical signals.

The switching system 100 shown in FIG. 24 performs processes, such as an optical/electrical conversion, at switching time. Unlike the switching system 100, however, the optical packet switching system 100*a* performs high-speed optical switching on optical packets. By doing so, processing capability can be improved. The research and development are currently being advanced.

To perform switching on optical signals by the packet, gate switches will be used for turning on and off the optical signals. Gate switches for turning on and off optical signals by electric control are broadly classed under two types. In gate switches of one type, absorption is changed by the use of an electro-absorption effect. In gate switches of the other type, gain is changed by drive current applied to a semiconductor amplifier.

Electro-absorption gate switches have the defect of, for example, a large loss even in a transparent state. Semiconductor optical amplifiers (SOAs), being switches in which gain is changed by drive current applied to a semiconductor amplifier, have not only a function as an optical gate for turning on and off optical signals but also an amplifying function (optical signals are amplified and outputted when they are in the ON state). With such SOAs, optical signal losses are small, so attention is currently given to them as high-speed optical switching elements.

An optical switch which prevents signals from leaking out from the output ends of optical gates is proposed as a conventional optical switching technique using SOAs (see, for example, Japanese Patent Laid-Open Publication No. 2000-77769, paragraphs [0016]-[0021] and FIG. 1).

With SOAs, an extinction ratio is high and optical loss can be reduced by an amplification mechanism. (An extinction ratio is the ratio of the average of the light intensity of the signals "1" and "0" at the time of a gate being in the ON state to the average of the light intensity of the signals "1" and "0" at the time of the gate being in the OFF state. When an extinction ratio is high, the ON and OFF states of a gate can be identified clearly, a crosstalk component from other ports is small, and a bit error rate is low.) In addition, SOAs are optical elements of semiconductors, so they can be miniaturized at low cost by using semiconductor integration techniques.

FIG. 26 shows a conventional optical switch core section including SOAs. An optical switch core section 50 shown in FIG. 26 is a 4×4 optical switch (having input ports #1 through #4 and output ports #1 through #4). The optical switch core section 50 includes optical input switch sections 50-1 through 50-4 and optical output switch sections 50-5 through 50-8.

The optical input switch section 50-1 includes a branch coupler 51*a* and SOAs 52*a*-1 through 52*a*-4. The optical input switch section 50-2 includes a branch coupler 51*b* and SOAs 52*b*-1 through 52*b*-4. The optical input switch section 50-3 includes a branch coupler 51c and SOAs 52c-1 through 52c-4. The optical input switch section 50-4 includes a branch coupler 51d and SOAs 52d-1 through 52d-4. The optical output switch sections 50-5 through 50-8 include multiplexing couplers 53a through 53d respectively.

The operation of the switch will now be described. Optical packets #2, #3, and #4 are inputted to the input port #1 and switching operation is performed (the destination of an optical packet #n is an output port #n).

The branch coupler 51a makes the optical packets #2, #3, and #4 branch in four directions and outputs them to the SOAs 52a-1 through 52a-4 (that is to say, the optical packets #2, #3, and #4 are sent to the SOA 52a-1, the optical packets #2, #3, and #4 are sent to the SOA 52a-2, the optical packets #2, #3, and #4 are sent to the SOA 52a-3, and the optical packets #2, #3, and #4 are sent to the SOA 52a-4).

Each of the SOAs 52a-1 through 52a-4 performs the operation of turning on/off a gate in response to a switch control signal sent from a host control section (not shown in FIG. 26). In this example, the SOA 52a-2 goes into the ON state (the SOAs 52a-1, 52a-3, and 52a-4 are in the OFF state) at the timing at which the optical packet #2 arrives, the SOA 52a-3 goes into the ON state (the SOAs 52a-1, 52a-2, and 52a-4 are in the OFF state) at the timing at which the optical packet #3 arrives, and the SOA 52a-4 goes into the ON state (the SOAs 52a-1, 52a-2, and 52a-3 are in the OFF state) at the timing at which the optical packet #4 arrives. As a result, the optical packets #2, #3, and #4 are outputted.

The multiplexing couplers 53a through 53d included in the optical output switch sections 50-5 through 50-8, respectively, receive optical packets sent from the optical input switch sections 50-1 through 50-4 by switching, time-division-multiplex them, and output them from the output ports #1 through #4 respectively. In this example, a group of optical packets #2 are outputted from the output port #2, a group of optical packets #3 are outputted from the output port #3, and a group of optical packets #4 are outputted from the output port #4.

In the above description, the 4×4 optical packet switch is shown as an example. To realize N×N switching by using one-stage SOA structure (a single SOA is located on a path along which optical packets are sent) which is the same as that described above, N one-to-N branch couplers and N×N SOAs are located on the input port side and N N-to-one multiplexing couplers are located on the output port side.

If a large-capacity switching system with many ports is built in this way by using the conventional structure, the following problems arise. A crosstalk component from adjacent ports increases. It is difficult to obtain a desired optical signal to noise ratio (OSNR). In addition, it is difficult to locate a fault in a switching system using SOAs. These problems will now be described.

FIGS. 27A and 27B are views for describing how a crosstalk component from adjacent ports increases in the case of including many ports. FIG. 27A is a view showing the case where four SOAs are used for gating and where a small number of ports are included. FIG. 27B is a view showing the case where 128 SOAs are used for gating and where a large number of ports are included.

In FIG. 27A, output lines of SOAs g1 through g4 are connected to a multiplexing coupler 53, the SOA g2 is in the ON state, and the SOAs g1, g3, and g4 are in the OFF state. Ideally, a signal is not outputted when an SOA is in the OFF state. Practically, however, though the extinction ratio of an SOA is high, a small portion of a signal component and an amplified spontaneous emission (ASE) are outputted even when the SOA is in the OFF state. These are noise components and are combined by the multiplexing coupler 53 into a crosstalk component (leakage signal component) from adjacent ports.

The multiplexing coupler 53 multiplexes and outputs signal components s1 through s4 outputted from the SOAs g1 through g4 respectively. If the four SOAs are used for gating, the level of accumulated noise is low (that is to say, a crosstalk component from adjacent ports is small) and a signal selected by the SOA g2 can properly be identified at the output stage of the multiplexing coupler 53.

In FIG. 27B, output lines of SOAs g1 through g128 are connected to a multiplexing coupler 53, the SOA g2 is in the ON state, and the SOAs g1 and g3 through g128 are in the OFF state.

The multiplexing coupler 53 multiplexes and outputs signal components s1 through s128 outputted from the SOAs g1 through g128 respectively. If as many as 128 SOAs are included, 127 noise signals outputted from the SOAs which are in the OFF state and a signal component s2 selected by the SOA g2 are combined.

That is to say, if the conventional switching system shown in FIG. 26 includes many (128 or 256, for example) ports, noise signals outputted from many SOAs in the OFF state and a signal component selected by an SOA are combined by a multiplexing coupler. This increases a crosstalk component. As a result, it is difficult to identify the signal component selected by the SOA at the output stage of the multiplexing coupler. Therefore, a bit error rate drops significantly.

As stated above, the level of a crosstalk component from adjacent ports which is negligible in a switching system including a small number of ports is too high in a large-scale switching system including a large number of ports to neglect.

The problem of degradation in OSNR will now be described. FIG. 28 is a view for describing a degradation of an OSNR. In FIG. 28, a vertical axis indicates power and a horizontal axis indicates a frequency. An OSNR is the ratio of signal power to noise power and differential D between a peak value Pn of noise signal power and a peak value Ps of signal power can be considered as an OSNR. If the differential D is smaller than a certain value, the signal cannot be identified with accuracy.

In a small-scale switching system including a small number of ports, the number of branches by branch couplers is small and a signal level does not drop significantly. In addition, the level of accumulated noise due to SOAs is low. Accordingly, the differential D is greater than or equal to the certain value and a desired OSNR can be obtained.

In a large-scale switching system including a large number of ports, however, the number of branches by branch couplers is large and great branch loss occurs. As a result, a signal level drops significantly. In addition, the level of accumulated noise due to SOAs is high. Accordingly, the value of the differential D is small and a desired OSNR cannot be obtained.

The problem of difficulty in locating a fault in a switching system using SOAs will now be described. If switching is performed between the input port #1 and the output port #1 in the conventional optical switch core section 50 shown in FIG. 26, the SOA 52a-1 goes into the ON state. If optical output is sent from an input line card at the input port #1 and the optical packet is not received at the output port #1, there is a strong possibility that a fault has occurred in the SOA 52a-1. When a fault occurs in the conventional switching system having one-stage SOA structure, it is easy to locate the fault.

It is assumed that a large-scale switching system including a large number of ports is built by multistage-connecting SOAs on paths along which optical packets are sent. In such a system in which the multistage connection of SOAs is made, it is impossible to locate a fault by the above simple method.

In a large-scale switching system, n SOAs are placed on a path over which optical packets are sent. Even if an optical packet is not received at an output port, it is impossible to locate one of the n SOAs in which a fault has occurred.

In such a system, a fault may be located by monitoring output from each SOA. However, this method cannot be applied. The reason for this is as follows.

In ordinary optical line switching systems, optical power is monitored to supervise the state of a signal. FIG. 29 shows the operation for monitoring optical power. A laser diode (LD) 111 outputs an optical signal. A photodiode (PD) 113 monitors the intensity of an optical signal which a coupler 112 makes branch thereto. A monitoring result is sent to the LD 111. The LD 111 outputs an optical signal while adjusting the intensity by feedback on the basis of the monitoring result (the LD may be replaced by an optical amplifier). In the conventional optical line switching system, the state of an optical signal can be supervised in this way by monitoring it with the PD, so the operating state of the LD (or optical amplifier) can be recognized from a monitoring result.

However, such a state supervision mechanism cannot be applied in the same way to optical packet switching systems including multistage-connected SOAs. That is to say, output from an SOA with which the LD is replaced cannot be monitored with a PD.

The reason for this is as follows. The SOA performs the high-speed gating of optical packets having a pulse width of about several hundred nanoseconds. Accordingly, if optical packet signals sent at a high speed are supervised with a PD the response characteristics of which depend on a time constant in a circuit, definite pulse intensity cannot be recognized (the amplitude of a waveform actually observed is approximately zero).

Therefore, the ordinary state supervision mechanism using a PD cannot be applied to an SOA. A good number of SOAs are used in a large-scale system including many ports. If some fault occurs in an SOA in such a switching system, there has conventionally been no effective fault locating mechanism. This makes it very difficult to locate the SOA in which the fault has occurred, resulting in degradation in reliability.

As has been described in the foregoing, SOAs are considered to be suitable as main optical devices for high-speed optical packet switching techniques. In conventional switching systems using SOAs, however, as their scale increases, the above problems become more marked and transmission quality is degraded. Accordingly, in the field of optical communication it is greatly hoped that an optical packet switching system in which a crosstalk component is reduced, in which an OSNR is improved, and in which a fault is efficiently detected will be realized.

SUMMARY OF THE INVENTION

The present invention was made under the background circumstances described above. An object of the present invention is to provide an optical packet switching system in which transmission quality, reliability, and system management in optical packet switching control are improved by reducing a crosstalk component from adjacent ports, improving an OSNR, and efficiently locating a fault.

In order to achieve the above object, an optical packet switching system for performing optical packet transmission is provided. This optical packet switching system comprises input line cards for generating port connection requests for connecting input ports and output ports and for sending optical packets; an optical packet switch section including semiconductor optical amplifiers as gate switches multistage-connected on paths along which the optical packets sent from the input line cards are transmitted for performing optical packet switching by broadcasting the optical packets to a plurality of gate switches, by selecting the optical packets by ON/OFF gating operation of the gate switches, and by absorbing noise signals which flow along non-selected paths by putting gate switches at a final stage into the OFF state; a switch control section for exercising centralized control over the optical packet switching, and for exercising ON/OFF drive control over the gate switches in the optical packet switch section on the basis of the port connection requests so as to generate requested paths; and output line cards for receiving the optical packets sent by the switching and for outputting the optical packets from output ports.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 17 shows a port connection information table.

FIG. 21 shows a fault location table.

FIG. 28 is a view for describing a degradation of an OSNR.

DESCRIPTION OF THE PREFERRED EMBODIMENTS

Figure 1:
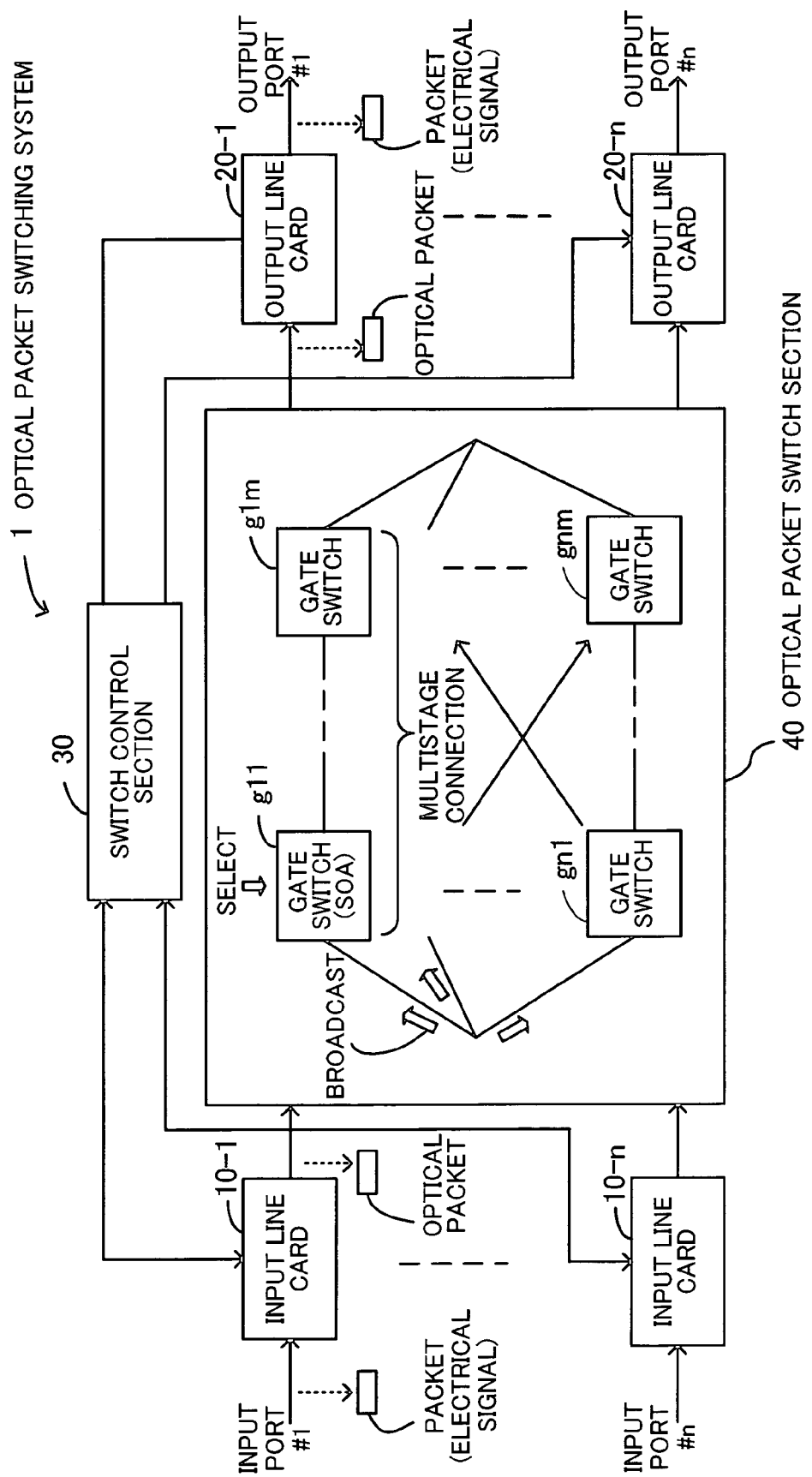
FIG. 1 is a view for describing the principles underlying an optical packet switching system.

Embodiments of the present invention will now be described with reference to the drawings. FIG. 1 is a view for describing the principles underlying an optical packet switching system. An optical packet switching system 1 comprises input line cards 10-1 through 10-$n$, output line cards 20-1 through 20-$n$, a switch control section 30, and an optical packet switch section 40 and performs broadcast-select optical packet switching with an integrated gate switch.

When the input line cards 10-1 through 10-$n$ receive packets (electrical signals) from input ports #1 through #n respectively, the input line cards 10-1 through 10-$n$ generate port connection requests for connecting the input ports #1 through #n and output ports #1 through #n and send the port connection requests to the switch control section 30. In addition, the input line cards 10-1 through 10-$n$ convert the packets into optical packets (E/O conversion) and send them to the optical packet switch section 40. Hereinafter the term "packet" means an electrical signal packet (the term "optical packet" means an optical signal packet).

The optical packet switch section 40 includes semiconductor optical amplifiers (SOAs) as gate switches multistage-connected on paths along which the optical packets sent from the input line cards 10-1 through 10-$n$ are transmitted. In FIG. 1, gate switches g11 through g1$m$ are arranged horizontally, so they form m stages (in the symbol "gij" for a gate switch, "i" indicates a row number and "j" indicates a column number).

Optical packet switching is performed by broadcasting the optical packets to a plurality of gate switches, by selecting an optical packet by gating operation by which the gate switches go into the ON/OFF state, and by absorbing noise signals which flow along non-selected paths by putting gate switches at final stages into the OFF state.

The switch control section 30 exercises ON/OFF drive control over the gate switches in the optical packet switch section 40 on the basis of the port connection requests so as to generate requested switch paths.

The output line cards 20-1 through 20-$n$ receive switched optical packets, make O/E conversions on the switched optical packets, generate electrical signal packets, and output them from the output ports #1 through #n to transmission lines.

The reasons why a reduction in crosstalk from adjacent ports and the improvement of an OSNR can be realized by the optical packet switching system 1 will now be described. Hereinafter a gate switch will be referred to as an SOA.

Figure 2:
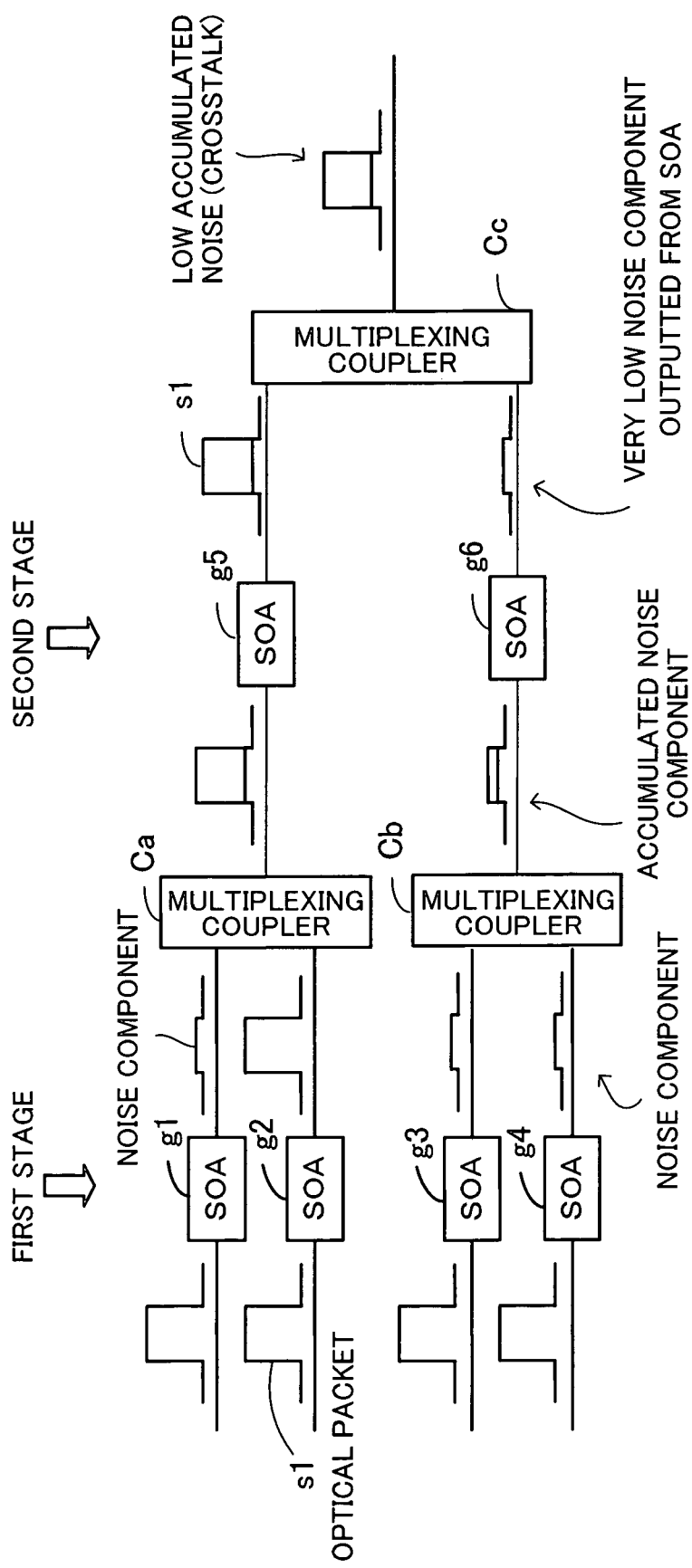
FIG. 2 shows gating by multistage-connected SOAs.

FIG. 2 shows gating by multistage-connected SOAs. An example of a model of gating operation by the optical packet switching system 1 is shown. In the optical packet switch section 40, output lines of SOAs g1 and g2 are connected to a multiplexing coupler Ca and output lines of SOAs g3 and g4 are connected to a multiplexing coupler Cb. SOAs g5 and g6 are located at the output stages of the multiplexing couplers Ca and Cb respectively. Output lines for the SOAs g5 and g6 are connected to a multiplexing coupler Cc.

It is assumed that gate switching is performed on an optical packet s1 and that the optical packet s1 is outputted from the multiplexing coupler Cc. When the SOA g1 is in the OFF state and the SOA g2 is in the ON state, the multiplexing coupler Ca multiplexes the optical packet s1 amplified and selected by the SOA g2 and a noise component outputted from the SOA g1. The extinction ratio of an SOA is high. As a result, the noise component outputted from the SOA g1 in the OFF state is at a very low level, so no problem arises when a code identification process is performed at a subsequent stage. Therefore, crosstalk does not influence the optical packet s1 outputted from the multiplexing coupler Ca. The SOAs g3 and g4 are in the OFF state, so the multiplexing coupler Cb multiplexes and outputs noise components outputted from the SOAs g3 and g4.

The SOA g5 goes into the ON state and amplifies and selects the optical packet s1. On the other hand, the SOA g6 goes into the OFF state and absorbs (reduces) a noise component outputted from the multiplexing coupler Cb. The multiplexing coupler Cc multiplexes the selected optical packet s1 and a noise component outputted from the SOA g6. The extinction ratio of an SOA is high. As a result, the noise component outputted from the SOA g6 in the OFF state is at a very low level, so no problem arises when the code identification process is performed at the subsequent stage. Therefore, crosstalk does not influence the optical packet s1 outputted from the multiplexing coupler Cc.

Figure 27A:
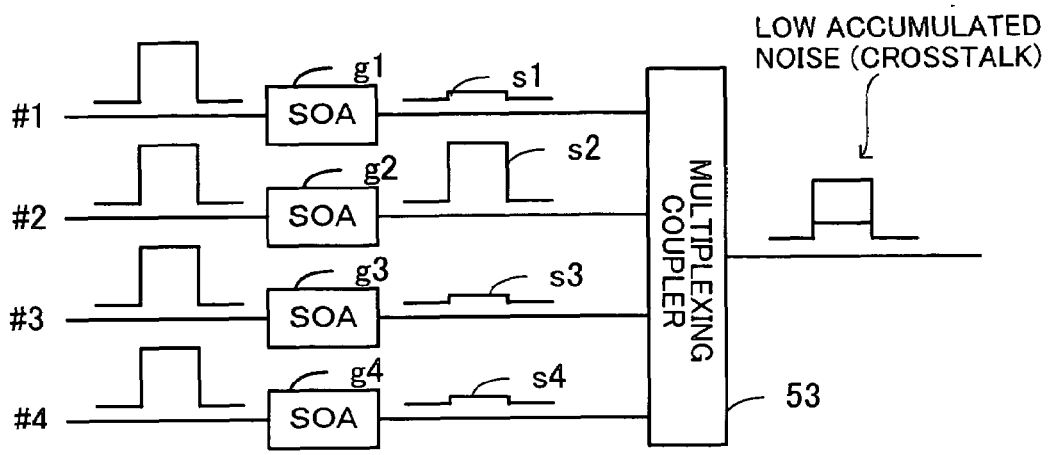
FIGS. 27A and 27B are views for describing how a crosstalk component from adjacent ports increases in the case of including many ports, FIG. 27A being a view showing the case where four SOAs are used for gating and where a small number of ports are included, FIG. 27B being a view showing the case where 128 SOAs are used for gating and where a large number of ports are included.
Figure 27B:
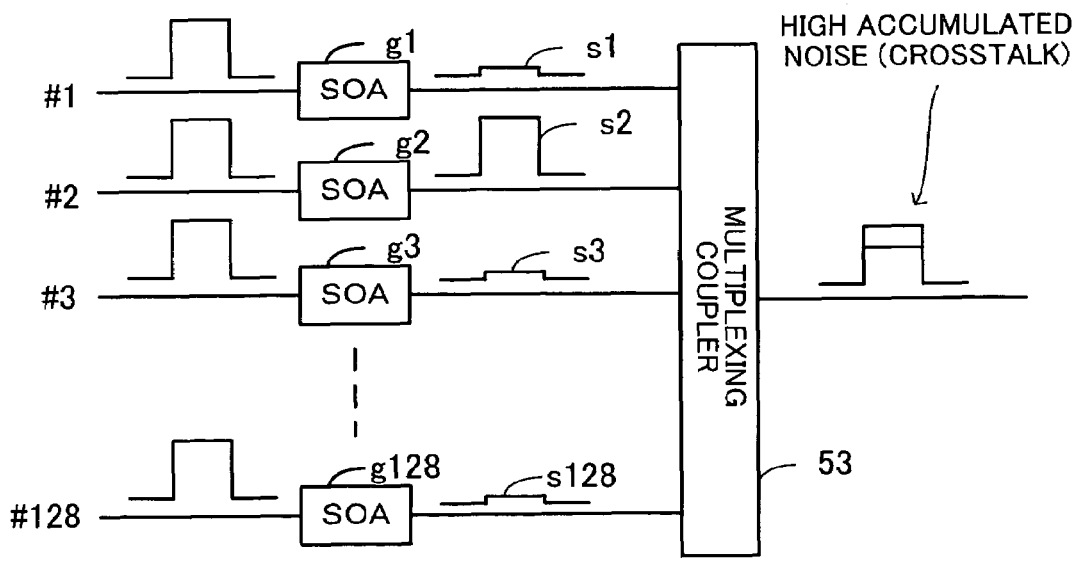
Figure 29:
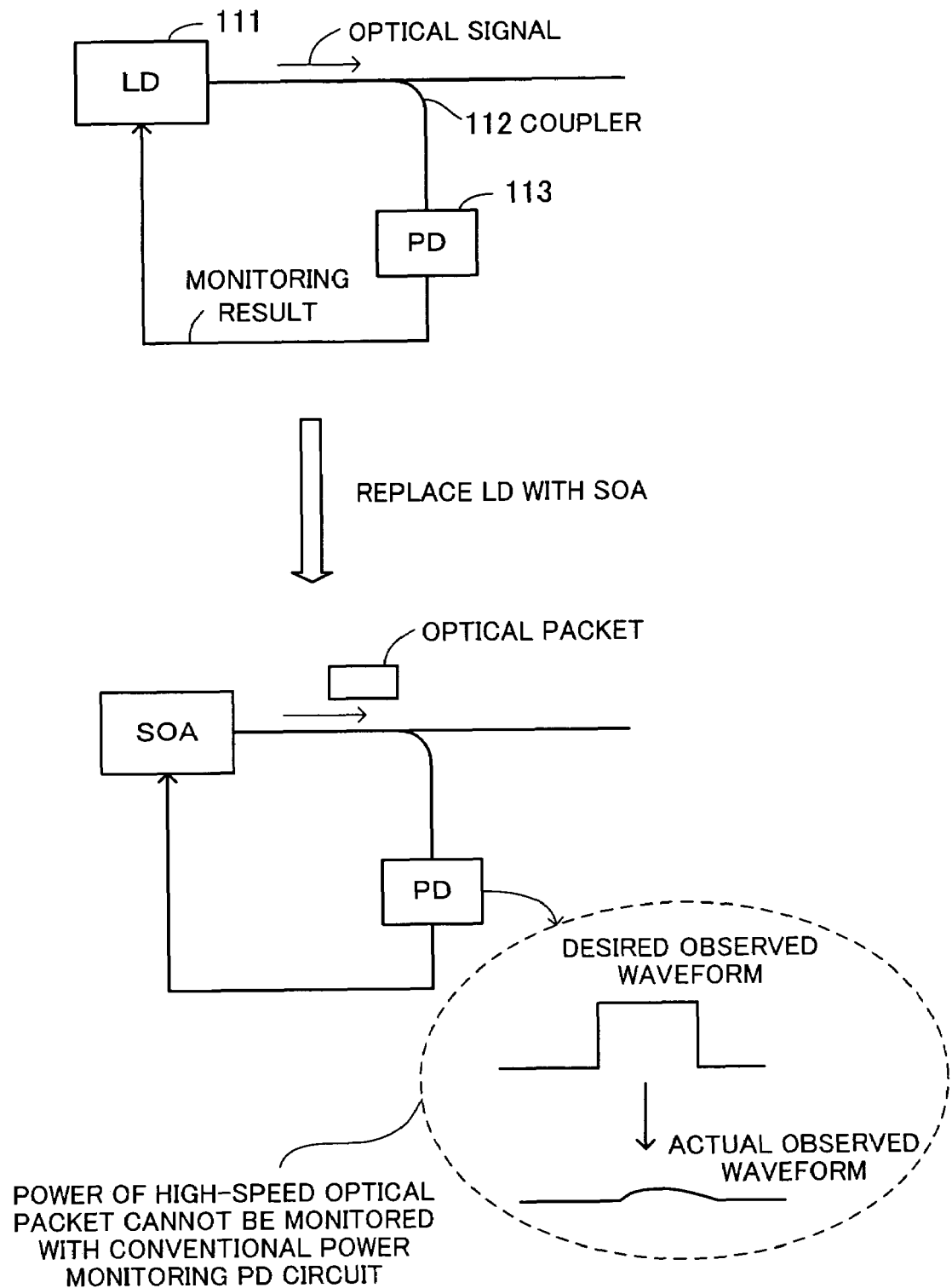
FIG. 29 shows the operation for monitoring optical power.

Conventionally, as shown in FIG. 27B, a signal outputted from one of one-stage SOAs which is selected and which goes into the ON state and noise components outputted from the other one-stage SOAs which are not selected and which go into the OFF state (noise components which flow along all of the non-selected paths) are combined by the multiplexing coupler. As a result, accumulated noise is high and crosstalk from adjacent ports has a great influence.

In the optical packet switching system 1, however, SOAs are multistage-connected (for the sake of simplicity, the number of stages in the example shown in FIG. 2 is two), the noise component which flows along the non-selected path is absorbed by the SOA g6 at the final stage, and the multiplexing coupler Cc multiplexes the selected optical packet s1 and the noise component outputted from the SOA g6 (a very low noise component outputted from an SOA in the OFF state replaces the noise component which flows along the non-selected path). As a result, noise components are not accumulated at the multiplexing coupler Cc and a crosstalk component from adjacent ports can be reduced.

The optical packet switching system 1 is applied to a large-scale switching system including a large number of ports. The number of branches by branch couplers increases. However, SOAs are multistage-connected on paths along which optical packets are transmitted (that is to say, an SOA is located behind a branch coupler). Therefore, each time branch loss occurs, it is compensated for by an SOA. This prevents the level of a signal from dropping. In addition, as stated above, accumulated noise produced by combining noise components outputted from SOAs is cut off by putting the SOA at the final stage into the OFF state. As a result, a desired OSNR can be obtained.

It is conceivable that a rare-earth-doped fiber amplifier, such as an erbium-doped fiber amplifier (EDFA), will be used for compensating for branch loss. However, the level of a signal cannot be maintained by locating an EDFA in an optical packet switch. The reason for this is that the lifetime of rare-earth ions in an EDFA is too long to exercise gating control over optical packet signals having a pulse width of about several hundred nanoseconds.

With the optical packet switching system 1, the problem of branch loss is also solved by multistage-connecting SOAs each having not only an amplifying function but also a gating function at the level of the lifetime of carriers in a semiconductor on paths along which optical packets are transmitted.

Figure 3:
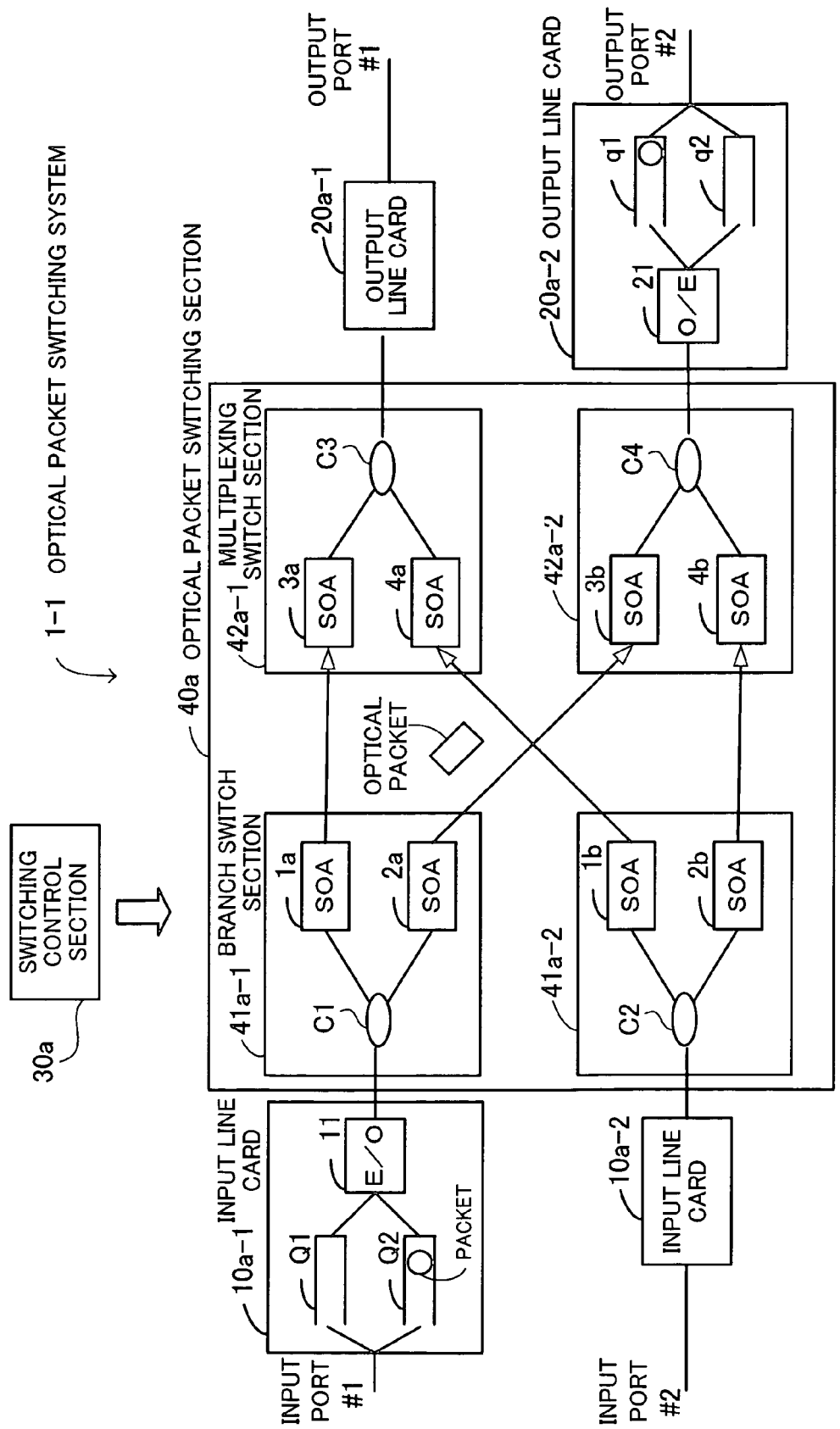
FIG. 3 shows the rough structure of an optical packet switching system.

The rough structure and operation of the optical packet switching system 1 will now be described with simple 2×2 and 4×4 switches as examples. FIG. 3 shows the rough structure of an optical packet switching system. In FIG. 3, 2×2 optical packet switching is performed. An optical packet switching system 1-1 comprises input line cards 10a-1 and 10a-2, output line cards 20a-1 and 20a-2, a switch control section 30a, and an optical packet switch section 40a.

Each of the input line cards 10a-1 and 10a-2 includes queues Q1 and Q2 and an E/O 11. Each of the output line cards 20a-1 and 20a-2 includes queues q1 and q2 and an O/E 21. The number of queues in each input line card is the same as that of input ports. The number of queues in each output line card is the same as that of output ports. If N×N switching is performed, the number of input ports is N and the number of output ports is N. Accordingly, N queues are included in one line card.

The optical packet switch section 40a includes branch switch sections 41a-1 and 41a-2 and multiplexing switch sections 42a-1 and 42a-2. The branch switch section 41a-1 includes a coupler C1 and SOAs 1a and 2a. The branch switch section 41a-2 includes a coupler C2 and SOAs 1b and 2b. The multiplexing switch section 42a-1 includes a coupler C3 and SOAs 3a and 4a. The multiplexing switch section 42a-2 includes a coupler C4 and SOAs 3b and 4b.

An overview of operation performed for outputting a packet inputted from an input port #1 to an output port #2 by switching will now be given. Operation regarding an exchange of control information between the input line cards 10a-1 and 10a-2 and the switch control section 30a and between the output line cards 20a-1 and 20a-2 and the switch control section 30a will be omitted (communication between the input line cards and the switch control section and between the output line cards and the switch control section will later be described in FIGS. 8 through 10).

When the input line card 10a-1 receives a packet via the input port #1, the input line card 10a-1 stores the packet in the queue Q2. Queue numbers correspond to output port numbers. For example, if the packet is outputted to an output port #N by switching, then the input line card 10a-1 stores the packet in an Nth queue. In this case, the packet is outputted to the output port #2, so it is stored in the queue Q2. The E/O 11 converts the packet outputted from the queue Q2 into an optical signal, generates an optical packet, and sends the optical packet to the optical packet switch section 40a.

When the optical packet is received by the branch switch section 41a-1, the coupler C1 makes the optical packet branch in two directions and broadcasts it to the SOAs 1a and 2a. Each of the SOAs 1a and 2a goes into the ON/OFF state in accordance with instructions as to driving from the switch control section 30a. In this case, the SOA 1a goes into the OFF state and the SOA 2a goes into the ON state. The SOA 2a in the ON state amplifies and outputs the optical packet, so branch loss at the coupler C1 is compensated for.

When the optical packet is received by the multiplexing switch section 42a-2, the SOA 3b goes into the ON state in accordance with instructions as to driving from the switch control section 30a (the SOA 4b goes into the OFF state). The optical packet selected by the SOA 3b is sent to the output line card 20a-2 via the coupler C4.

The coupler C4 multiplexes the optical packet selected by the SOA 3b and a noise component outputted from the SOA 4b. However, the extinction ratio of an SOA is high. As a result, the noise component outputted from the SOA 4b in the OFF state is at a very low level, so no problem arises when a code identification process is performed at a subsequent stage. Therefore, crosstalk does not influence the optical packet and a desired OSNR is obtained.

In the output line card 20a-2, the O/E 21 converts the optical packet into an electrical signal and outputs the electrical signal to the queue q1. The queue q1 buffers the packet and outputs it from the output port #2.

Figure 4:
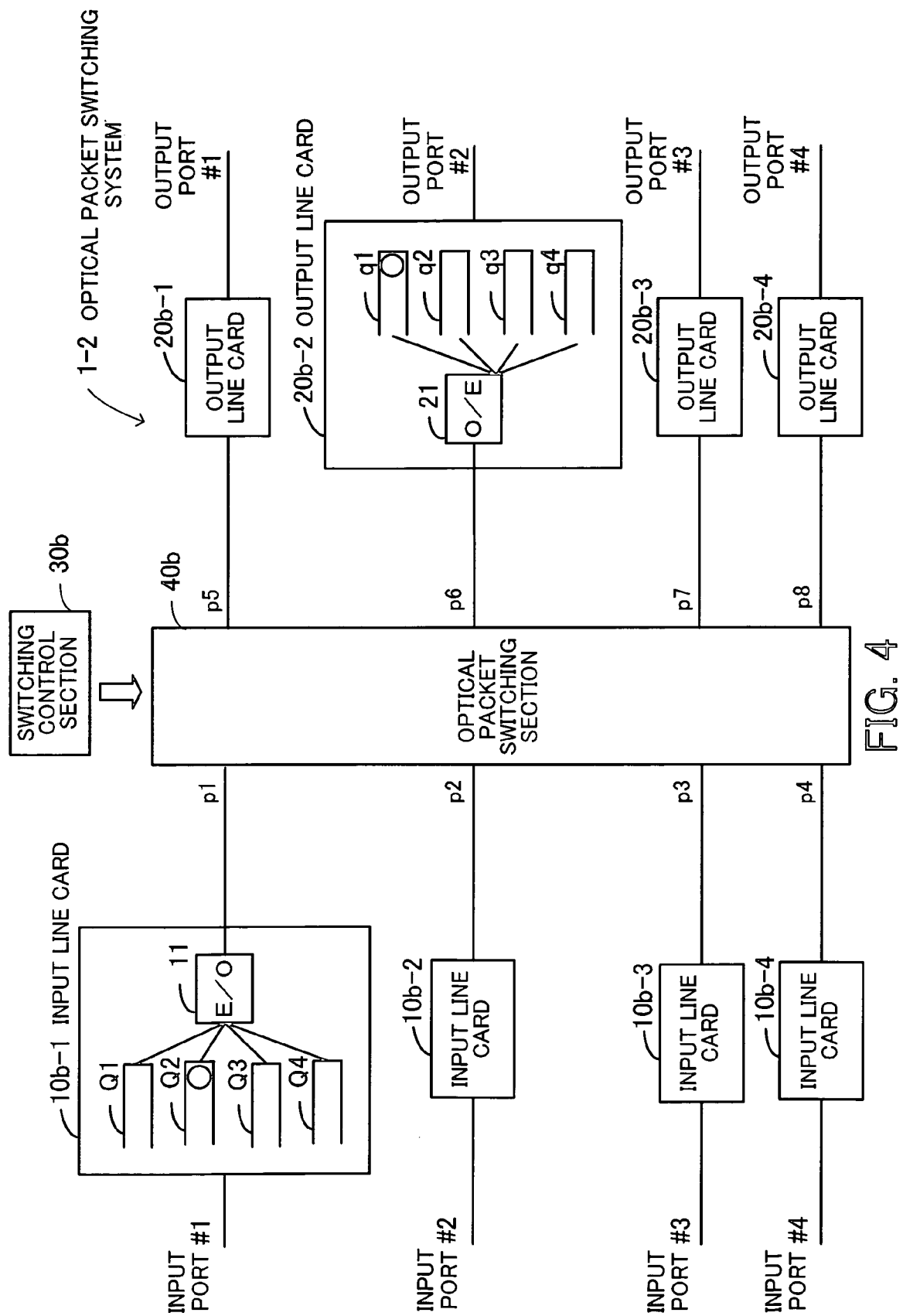
FIG. 4 shows the rough structure of an optical packet switching system.

4×4 optical packet switching will now be described by using FIGS. 4 and 5. FIG. 4 shows the rough structure of an optical packet switching system. An optical packet switching system 1-2 comprises input line cards 10b-1 through 10b-4, output line cards 20b-1 through 20b-4, a switch control section 30b, and an optical packet switch section 40b.

Each of the input line cards 10b-1 through 10b-4 includes queues Q1 through Q4 and an E/O 11. Each of the output line cards 20b-1 through 20b-4 includes queues q14 through q4 and an O/E 21 (the number of input ports and the number of output ports are both four, so four queues are located in each of the input line cards and the output line cards).

Figure 5:
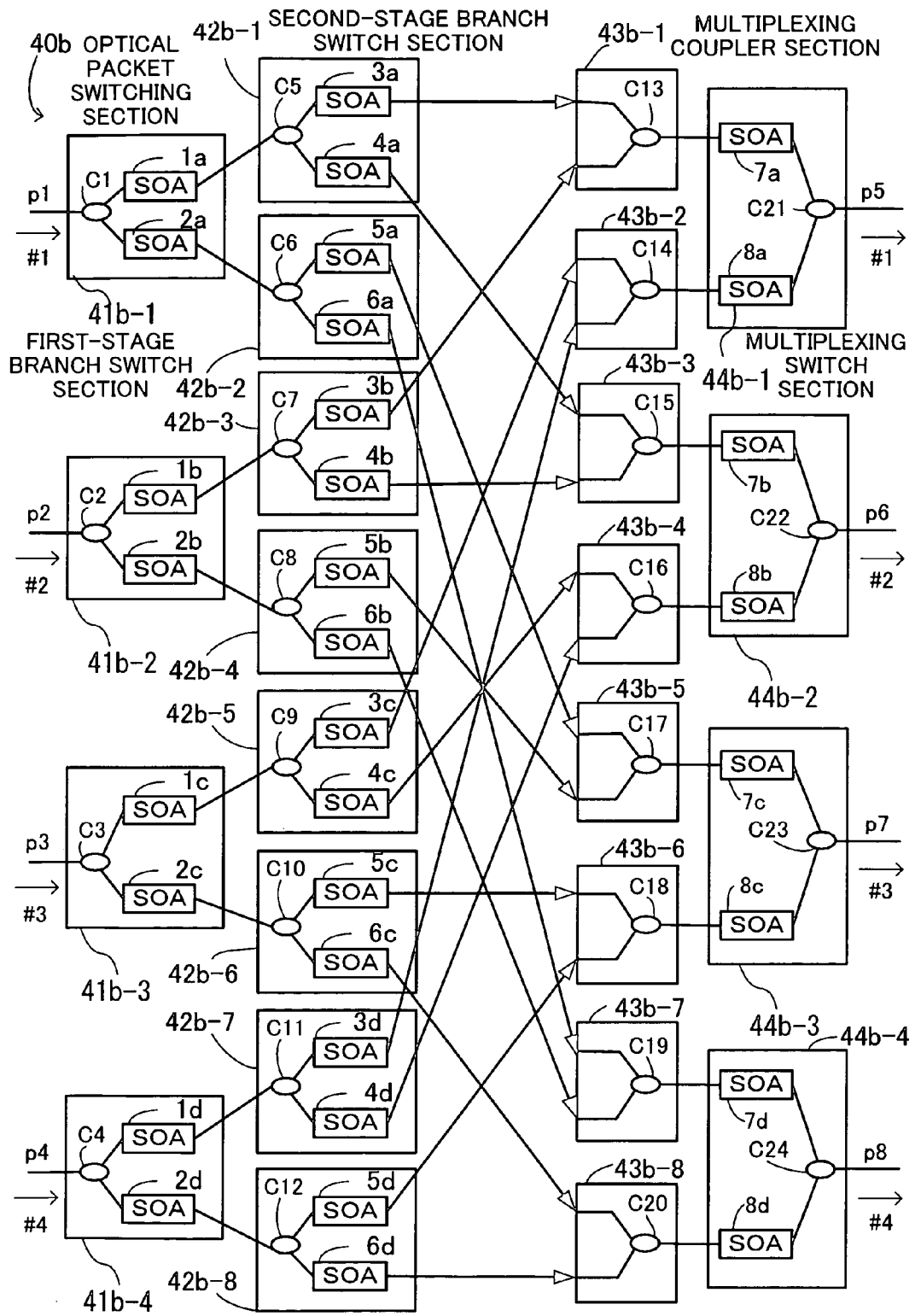
FIG. 5 shows the internal structure of an optical packet switch section.

FIG. 5 shows the internal structure of the optical packet switch section 40b. The optical packet switch section 40b includes first-stage branch switch sections 41b-1 through 41b-4, second-stage branch switch sections 42b-1 through 42b-8, multiplexing coupler sections 43b-1 through 43b-8, and multiplexing switch sections 44b-1 through 44b-4.

The first-stage branch switch section 41b-1 includes a coupler C1 and SOAs 1a and 2a. The first-stage branch switch section 41b-2 includes a coupler C2 and SOAs 1b and 2b. The first-stage branch switch section 41b-3 includes a coupler C3 and SOAs 1c and 2c. The first-stage branch switch section 41b-4 includes a coupler C4 and SOAs 1d and 2d.

The second-stage branch switch section 42b-1 includes a coupler C5 and SOAs 3a and 4a. The second-stage branch switch section 42b-2 includes a coupler C6 and SOAs 5a and 6a. The second-stage branch switch section 42b-3 includes a coupler C7 and SOAs 3b and 4b. The second-stage branch switch section 42b-4 includes a coupler C8 and SOAs 5b and 6b.

The second-stage branch switch section 42b-5 includes a coupler C9 and SOAs 3c and 4c. The second-stage branch switch section 42b-6 includes a coupler C10 and SOAs 5c and 6c. The second-stage branch switch section 42b-7 includes a coupler C11 and SOAs 3d and 4d. The second-stage branch switch section 42b-8 includes a coupler C12 and SOAs 5d and 6d.

The multiplexing coupler section 43b-1 includes a coupler C13. The multiplexing coupler section 43b-2 includes a coupler C14. The multiplexing coupler section 43b-3 includes a coupler C15. The multiplexing coupler section 43b-4 includes a coupler C16.

The multiplexing coupler section 43b-5 includes a coupler C17. The multiplexing coupler section 43b-6 includes a coupler C18. The multiplexing coupler section 43b-7 includes a coupler C19. The multiplexing coupler section 43b-8 includes a coupler C20.

The multiplexing switch section 44b-1 includes SOAs 7a and 8a and a coupler C21. The multiplexing switch section 44b-2 includes SOAs 7b and 8b and a coupler C22. The multiplexing switch section 44b-3 includes SOAs 7c and 8c and a coupler C23. The multiplexing switch section 44b-4 includes SOAs 7d and 8d and a coupler C24.

An overview of operation performed for outputting a packet inputted from an input port #1 to an output port #2 by switching will now be given. Operation regarding exchange between the input line cards and the switch control section and between the output line cards and the switch control section will be omitted.

When the input line card 10b-1 receives a packet via the input port #1, the input line card 10b-1 stores the packet in the queue Q2. The E/O 11 converts the packet outputted from the queue Q2 into an optical signal, generates an optical packet, and sends the optical packet to the optical packet switch section 40b.

When the optical packet is received by the first-stage branch switch section 41b-1, the coupler C1 makes the optical packet branch in two directions and broadcasts it to the SOAs 1a and 2a. In accordance with instructions as to driving from the switch control section 30b, the SOA 1a goes into the ON state and the SOA 2a goes into the OFF state. The SOA 1a in the ON state amplifies and outputs the optical packet, so branch loss at the coupler C1 is compensated for.

When the optical packet is received by the second-stage branch switch section 42b-1, the coupler C5 makes the optical packet branch in two directions and broadcasts it to the SOAs 3a and 4a. In accordance with instructions as to driving from the switch control section 30b, the SOA 3a goes into the OFF state and the SOA 4a goes into the ON state. The SOA 4a in the ON state amplifies and outputs the optical packet, so branch loss at the coupler C5 is compensated for.

The coupler C15 included in the multiplexing coupler section 43b-3 multiplexes the optical packet selected by the SOA 4a and a noise component outputted from the SOA 4b in the OFF state and sends a composite signal to the SOA 7b. (The extinction ratio of an SOA is high. Therefore, the noise component outputted from the SOA 4b is at a very low level. As a result, no problem arises by combining the noise component and the selected optical packet.)

When the optical packet is received by the multiplexing switch section 44b-2, the SOA 7b goes into the ON state (the SOA 8b goes into the OFF state) in accordance with instructions as to driving from the switch control section 30b. The optical packet selected by the SOA 7b is sent to the output line card 20b-2 via the coupler C22.

A noise component which flows to the SOA 8b along a non-selected path is absorbed by the SOA 8b at the final stage which is in the OFF state. Accordingly, the coupler C22 multiplexes the optical packet selected by the SOA 7b and a noise component outputted from the SOA 8b. The extinction ratio of an SOA is high. Therefore, the noise component outputted from the SOA 8b in the OFF state is at a very low level. As a result, no problem arises when a code identification process is performed at a subsequent stage.

Accordingly, in the optical packet sent from the optical packet switch section 40b to the output line card 20b-2, a crosstalk component from adjacent ports is reduced and an OSNR is improved.

In the output line card 20b-2, the O/E 21 converts the optical packet into an electrical signal and outputs the electrical signal to the queue q1. The queue q1 buffers the packet and outputs it from the output port #2.

Figure 6:
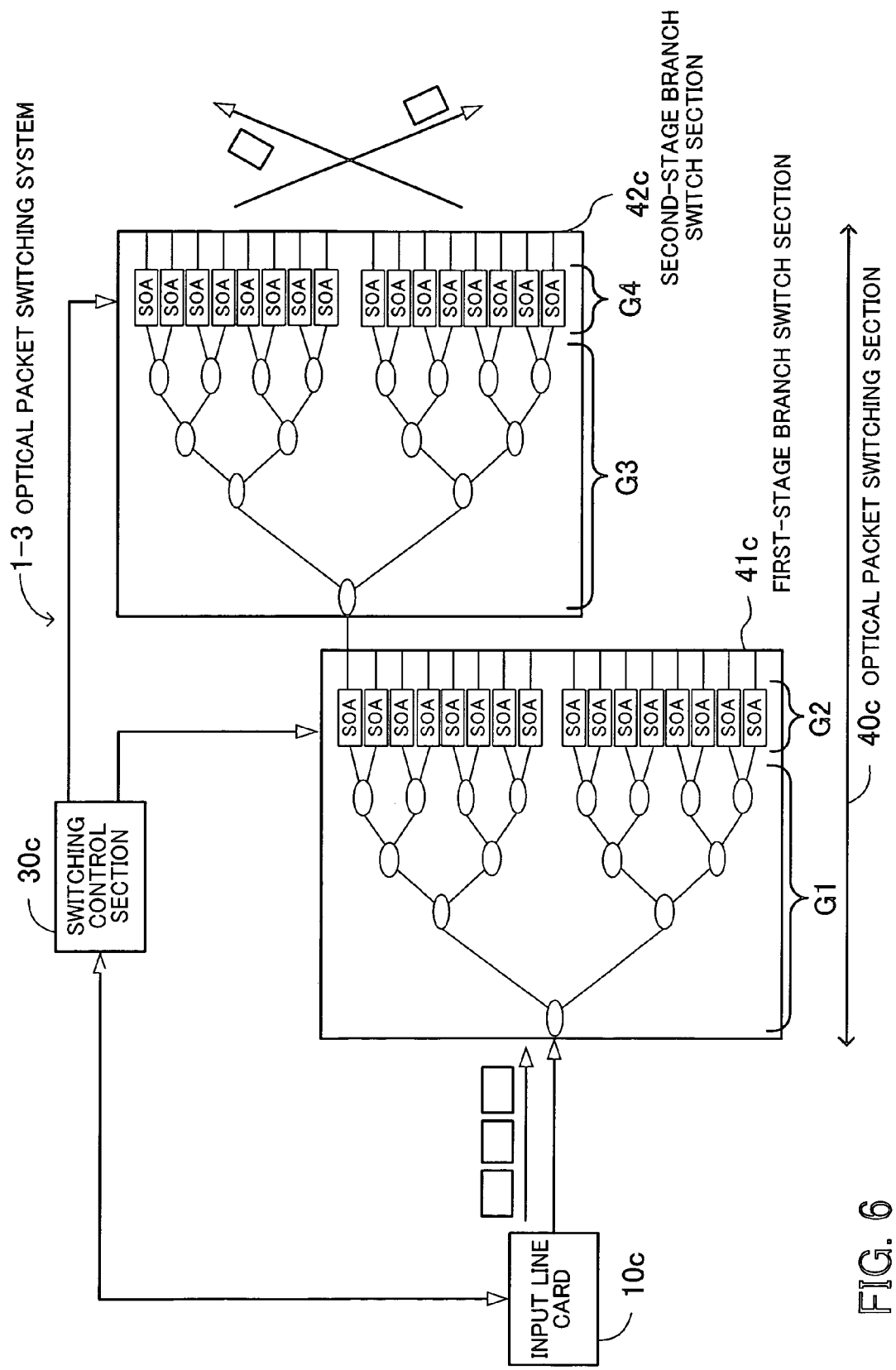
FIG. 6 shows the rough structure of an optical packet switching system.
Figure 7:
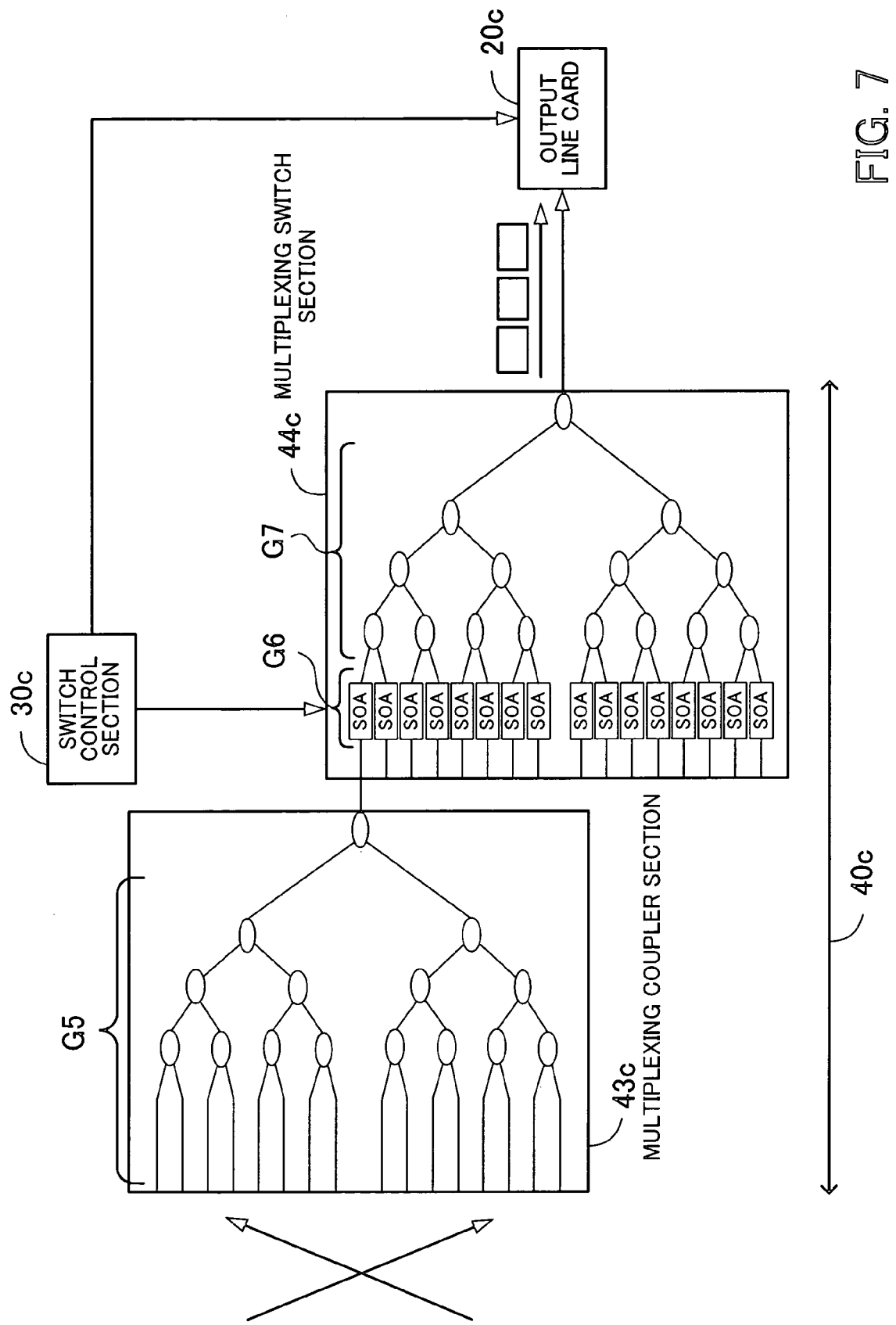
FIG. 7 shows the rough structure of an optical packet switching system.

The rough structure of the optical packet switching system 1 applied to a large-scale system including many ports will now be described. FIGS. 6 and 7 show the rough structure of an optical packet switching system. An optical packet switching system 1-3 is a 256×256 switch and comprises an input line card 10c, an output line card 20c, a switch control section 30c, and an optical packet switch section 40c. The optical packet switch section 40c includes a first-stage branch switch section 41c, a second-stage branch switch section 42c, a multiplexing coupler section 43c, and a multiplexing switch section 44c.

The optical packet switching system 1-3 is a 256×256 switch. Therefore, 256 input line cards 10c and 256 output line card 20c are actually required. In addition, 256 first-stage branch switch sections 41c, 256 multiplexing sections 44c, 16×256 second-stage branch switch sections 42c, and 16×256 multiplexing coupler sections 43c are required in the optical packet switch section 40c.

The first-stage branch switch section 41c includes a branch coupler group G1 and an SOA group G2. The second-stage branch switch section 42c includes a branch coupler group G3 and an SOA group G4. The multiplexing coupler section 43c includes a multiplexing coupler group G5. The multiplexing switch section 44c includes an SOA group G6 and a multiplexing coupler group G7.

An optical packet outputted from the input line card 10c is broadcast in sixteen directions by the branch coupler group G1 included in the first-stage branch switch section 41c and is sent to the SOA group G2. The optical packet amplified and outputted by one SOA of the SOA group G2 is broadcast again in sixteen directions by the branch coupler group G3 included in the second-stage branch switch section 42c, is sent to the SOA group G4, and is sent to a predetermined multiplexing coupler section.

The multiplexing coupler group G5 included in the multiplexing coupler section 43c multiplexes sixteen optical signals (including the optical packet and noise components) sent from the second-stage branch switch section 42c into one composite optical signal. The SOA group G6 included in the multiplexing switch section 44c performs switching on the composite optical signal sent from the multiplexing coupler group G5. Optical signals outputted from the SOA group G6 are multiplexed by the multiplexing coupler group G7 and are sent to the output line card 20c.

As with the 2×2 and 4×4 switches, each of the SOA groups G2 and G4 in the ON state amplifies and outputs the optical packet. As a result, branch loss is compensated for. SOAs in the OFF state of the SOA group G6 at the final stage shut out noise components which flow along non-selected paths. This reduces a crosstalk component from adjacent ports and improves an OSNR. (As can be seen from FIGS. 3 through 7, if the structure of the optical packet switching system 1 is adopted, effects, such as a reduction in crosstalk component and improvement in OSNR, grow with an increase in the number of ports included in a system.)

Control information communication (optical packet transfer control) performed between the input line cards 10-1 through 10-n (which are generically named "the input line card 10") and the switch control section 30 and between the output line cards 20-1 through 20-n (which are generically named "the output line card 20") and the switch control section 30 will now be described by using FIGS. 8 through 10.

Figure 8:
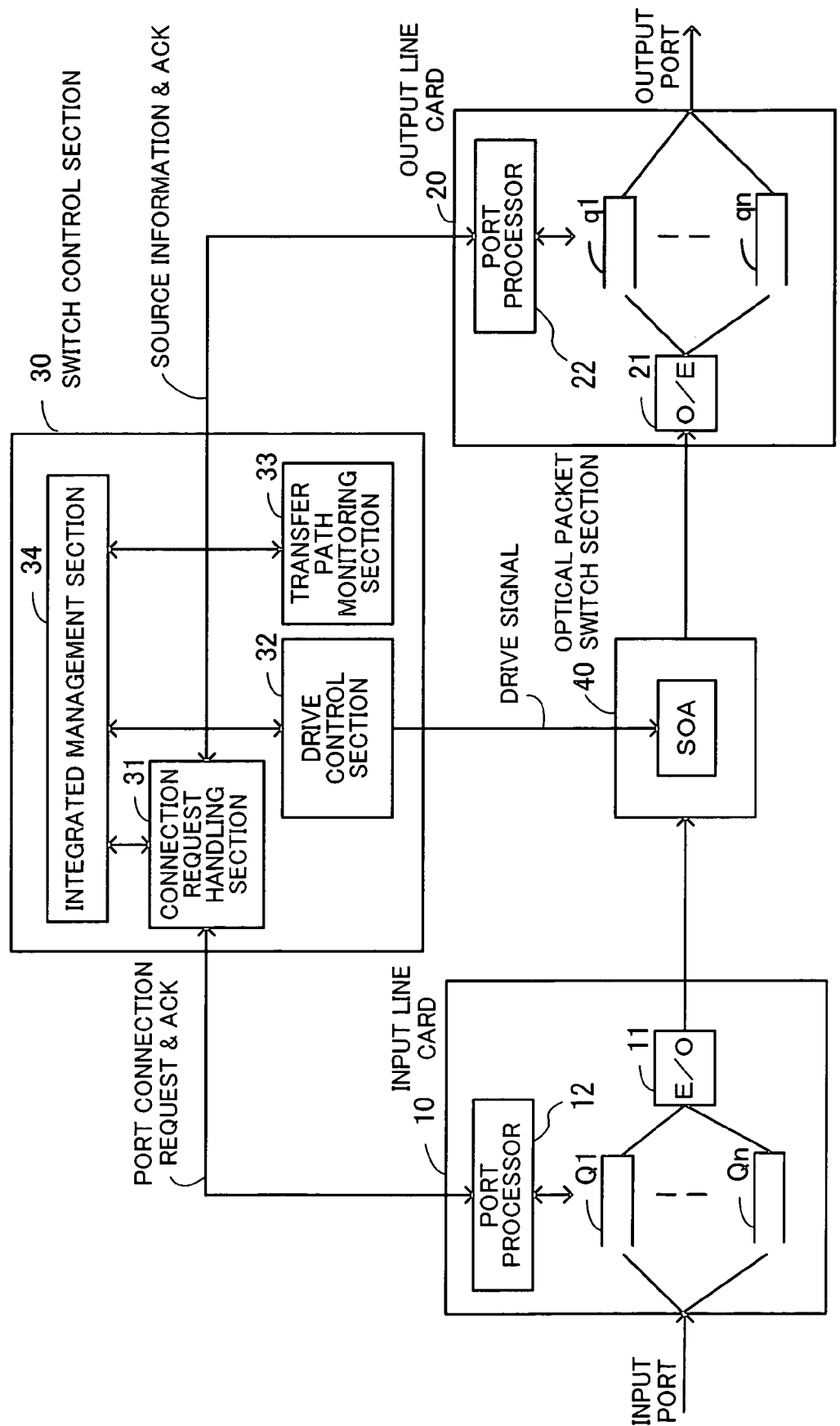
FIG. 8 shows the internal structure of an input line card, an output line card, and a switch control section.

FIG. 8 shows the internal structure of the input line card, the output line card, and the switch control section. The input line card 10 includes an E/O 11, queues Q1 through Qn, and a port processor 12. The output line card 20 includes an O/E 21, queues q1 through qn, and a port processor 22. The switch control section 30 includes a connection request handling section 31, a drive control section 32, a transfer path monitoring section 33, and an integrated management section 34.

When the input line card 10 receives a packet, the port processor 12 processes a source address and recognizes an output port, being a destination. In accordance with instructions from the port processor 12, packets which arrive at input ports are buffered in the corresponding queues Q1 through Qn and are collected according to output ports. The E/O 11 converts a packet outputted from one of the queues Q1 through Qn into an optical signal, generates an optical packet, and sends the optical packet to the optical packet switch section 40.

The port processor 12 exchanges control information (a port connection request and the like) regarding optical packet switching with the switch control section 30. In addition, the port processor 12 analyzes the destination of a packet which arrives at an input port (which output port it is to be outputted to by switching) and stores the packet in a queue the number of which is the same as that of the corresponding output port.

The port processor 12 manages which of the queues Q1 through Qn stores a packet, and sends a port connection request to the switch control section 30. (For example, to output a packet to the output port #3 by switching in the input line card 10-1 corresponding to the input port #1, the port processor 12 sends a port connection request including information for setting the switching from the input port #1 to the output port #3 to the switch control section 30.)

In the switch control section 30, the connection request handling section 31 receives a port connection request sent from each input line card, determines a connection path so that collision will not occur between ports at switching time, and returns port connect enable/disable information to each port processor. In FIG. 5, for example, it is assumed that a port connection request for the switching from the input port #1 to the output port #1 and a port connection request for the switching from the input port #2 to the output port #1 are made. If the SOAs 3a and 3b go into the ON state simultaneously, then a collision occurs on the input side of the SOA 7a. To avoid such a collision, the connection request handling section 31 determines whether requested port connection is possible, and returns a determination result. In addition, the connection request handling section 31 sends source information indicative of which input port the optical packet is sent from to the port processor 22 included in the output line card 20.

On the basis of the connection path determined, the drive control section 32 sends a drive signal (drive current) to an SOA in the optical packet switch section 40 to exercise ON/OFF control over it. The transfer path monitoring section 33 monitors the path from the input line card 10, through the optical packet switch section 40, to the output line card 20 along which an optical packet is transferred (and also performs fault recovery).

The integrated management section 34 exercises integrated management of control information exchanged between the switch control section 30 and a plurality of input line cards and between the switch control section 30 and a plurality of output line cards and exercises centralized control over the connection request handling section 31, the drive control section 32, and the transfer path monitoring section 33. For example, the integrated management section 34 sends the drive control section 32 a signal for giving instructions to switch an SOA with desired timing.

The O/E 21 converts the optical packet which arrives at the output line card 20 into an electrical signal and generates electrical packet. In accordance with instructions from the port processor 22, packets are buffered in the corresponding queues q1 through qn and are collected according to input ports.

The port processor 22 exchanges control information regarding optical packet switching with the switch control section 30. In addition, the port processor 22 receives the source information sent from the switch control section 30, recognizes an input port from which the received packet was sent by switching, and stores the packet in a queue the number of which is the same as that of the corresponding input port. The stored packet is outputted from an output port in accordance with instructions from the port processor 22. The port processor 22 also sends the switch control section 30 optical packet receiving notice indicative of whether the optical packet was received normally.

To synchronize the input line card 10 and the optical packet switch section 40 or the output line card 20 and the optical packet switch section 40, a control signal including the same clock is broadcast from the switch control section 30 to the input line card 10 and the output line card 20. The input line card 10 extracts the clock from the control signal and sends the optical packet switch section 40 an optical packet with desired sending timing. The output line card 20 extracts the clock from the control signal and receives, with desired receiving timing, the optical packet sent from the optical packet switch section 40. Each unit operates in synchronization with another unit in this way.

Figure 9:
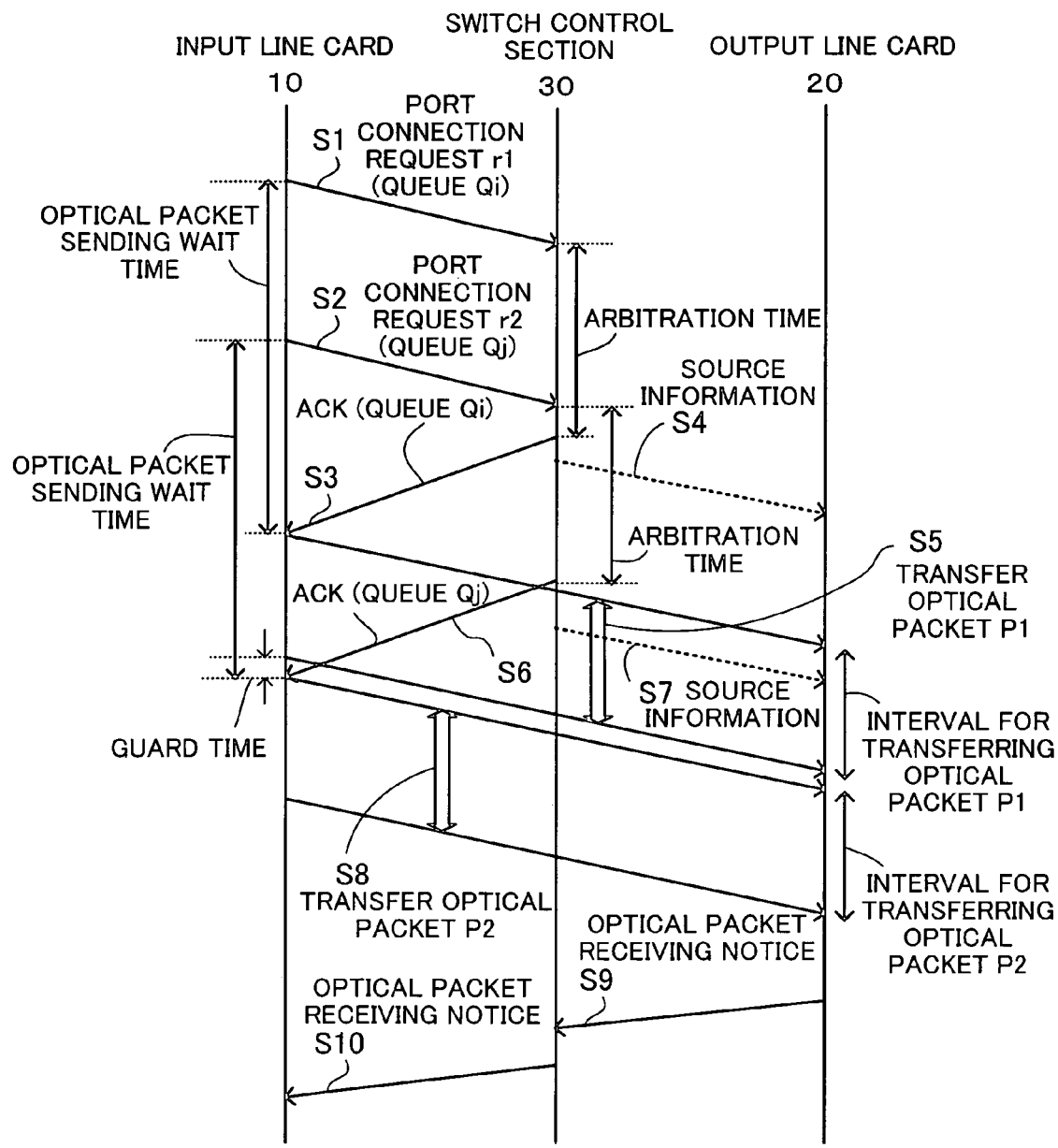
FIG. 9 is a sequence diagram showing communication between the input line card, the output line card, and the switch control section.

FIG. 9 is a sequence diagram showing communication between the input line card, the output line card, and the switch control section.

[S1] The input line card 10 sends the switch control section 30 a port connection request r1 regarding a packet stored in a queue Qi.

[S2] The input line card 10 sends the switch control section 30 a port connection request r2 regarding a packet stored in a queue Qj.

[S3] The switch control section 30 returns an ACK (acknowledge) signal for the port connection request r1 to the input line card 10. In this case, the ACK signal is outputted after the elapse of arbitration time. The arbitration time is necessary for avoiding a collision between ports at switching time and equals to an optical packet transfer time interval.

[S4] The switch control section 30 sends the output line card 20 source information indicative of which input port the optical packet is sent from.

[S5] The input line card 10 sends an optical packet P1 generated from information stored in the queue Qi. In this case, the input line card 10 sends the optical packet P1 optical packet sending wait time after the sending of the port connection request r1. Switching is performed on the optical packet P1 in the optical packet switch section 40 and then the optical packet P1 is received by the output line card 20.

[S6] The switch control section 30 returns an ACK signal for the port connection request r2 to the input line card 10 the arbitration time after the receiving of the port connection request r2.

[S7] The switch control section 30 sends the output line card 20 source information indicative of which input port the optical packet is sent from.

[S8] The input line card 10 sends an optical packet P2 generated from information stored in the queue Qj. In this case, the input line card 10 sends the optical packet P2 the optical packet sending wait time after the sending of the port connection request r2. Switching is performed on the optical packet P2 in the optical packet switch section 40 and then the optical packet P2 is received by the output line card 20.

[S9] When the output line card 20 receives the optical packets, the output line card 20 sends the switch control section 30 optical packet receiving notice (normal). If the output line card 20 cannot receive the optical packets normally, then the output line card 20 sends the switch control section 30 optical packet receiving notice (abnormal).

[S10] The switch control section 30 sends the input line card 10 the optical packet receiving notice (normal) sent from the output line card 20.

Figure 10:
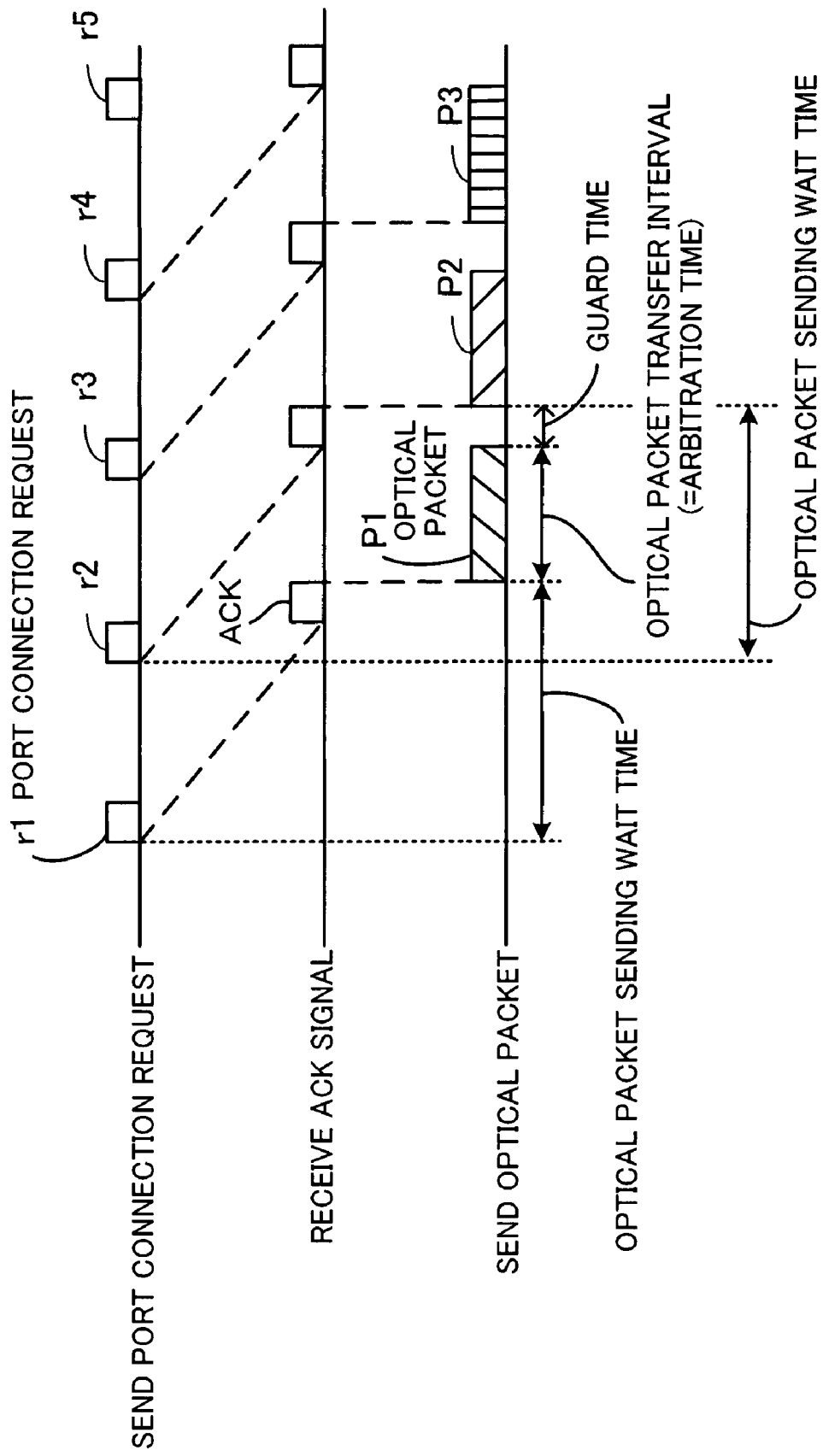
FIG. 10 is a timing chart of sending by the input line card.

FIG. 10 is a timing chart of sending by the input line card 10. The input line card 10 sends port connection requests r1 through r5. In addition, the input line card 10 receives an ACK signal corresponding to each port connection request sent from the switch control section 30.

When the input line card 10 receives an ACK signal corresponding to the port connection request r1, the input line card 10 sends an optical packet P1. Similarly, when the input line card 10 receives an ACK signal corresponding to the port connection request r2, the input line card 10 sends an optical packet P2.

In this case, the time interval of the optical packet sending wait time is placed after the sending of the port connection request r1 and before the sending of the optical packet P1. The optical packet sending wait time is given by optical packet sending wait time=(control information sending delay time)+(arbitration time)+(guard time)

where the control information sending delay time is time which elapses after the sending of control information (a port connection request or the like) by the input line card 10 and before the receiving of the control information by the switch control section 30, and the guard time is given by guard time=(switching time in the optical packet switch section 40)+(skew)+(margin)

where the skew is a variation in propagation delay time in optical packet transmission by an optical fiber cable between the input line card 10 and the optical packet switch section 40. This delay time is compensated for by the guard time. When each of the optical packets P1, P2, . . . is sent to the optical packet switch section 40, a time interval equal to the guard time is placed.

By communicating control information between the input line card 10 and the switch control section 30 and between the output line card 20 and the switch control section 30 in this way, each of the input line card 10, the output line card 20, and the switch control section 30 can independently recognize a switch path, that is to say, an input port from which a packet is inputted and an output port to which the packet is transmitted (an input port and an output port which connect). Therefore, these units can efficiently transmit an optical packet while establishing synchronization between them.

In the above description, control information mainly regarding optical packet transfer is exchanged between the port processor 12 included in the input line card 10 and the switch control section 30 and between the port processor 22 included in the output line card 20 and the switch control section 30. However, various pieces of control information (such as fault information and operation administration and maintenance (OAM) information) are exchanged between the port processor 12 and the switch control section 30 and between the port processor 22 and the switch control section 30 to exercise comprehensive control.

A maintenance terminal can be connected to the integrated management section 34 included in the switch control section 30. As a result, the present state of optical packet switching can be displayed on a screen of the maintenance terminal in real time or an operator can control the operation of each component (the ON/OFF driving of an SOA, for example) in accordance with instructions from the maintenance terminal.

Figure 11:
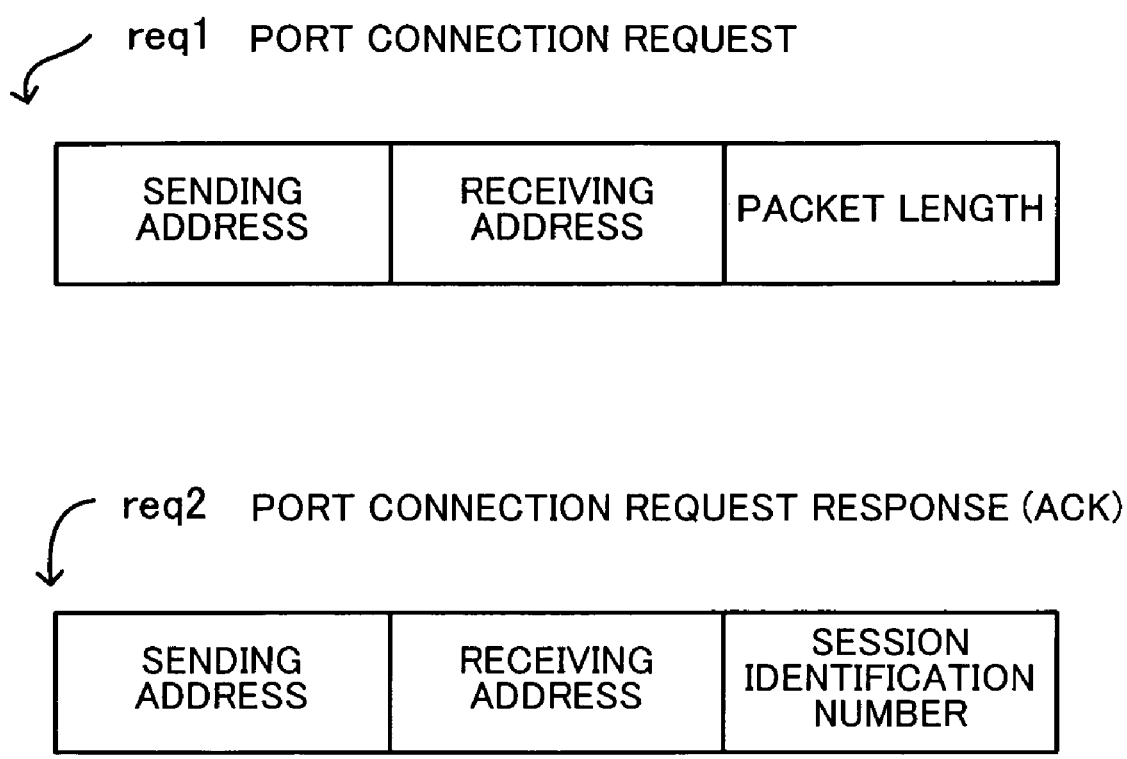
FIG. 11 shows the formats of a port connection request and a port connection request response.

The formats of an optical packet and control information will now be described. FIG. 11 shows the formats of a port connection request and a port connection request response. A port connection request req1 includes a sending address (input line card number and input port number), a receiving address (output line card number and output port number), and packet length. A port connection request response req2 (ACK) includes a sending address (input line card number and input port number), a receiving address (output line card number and output port number), and a session (optical packet transfer cycle) identification number.

Figure 12:
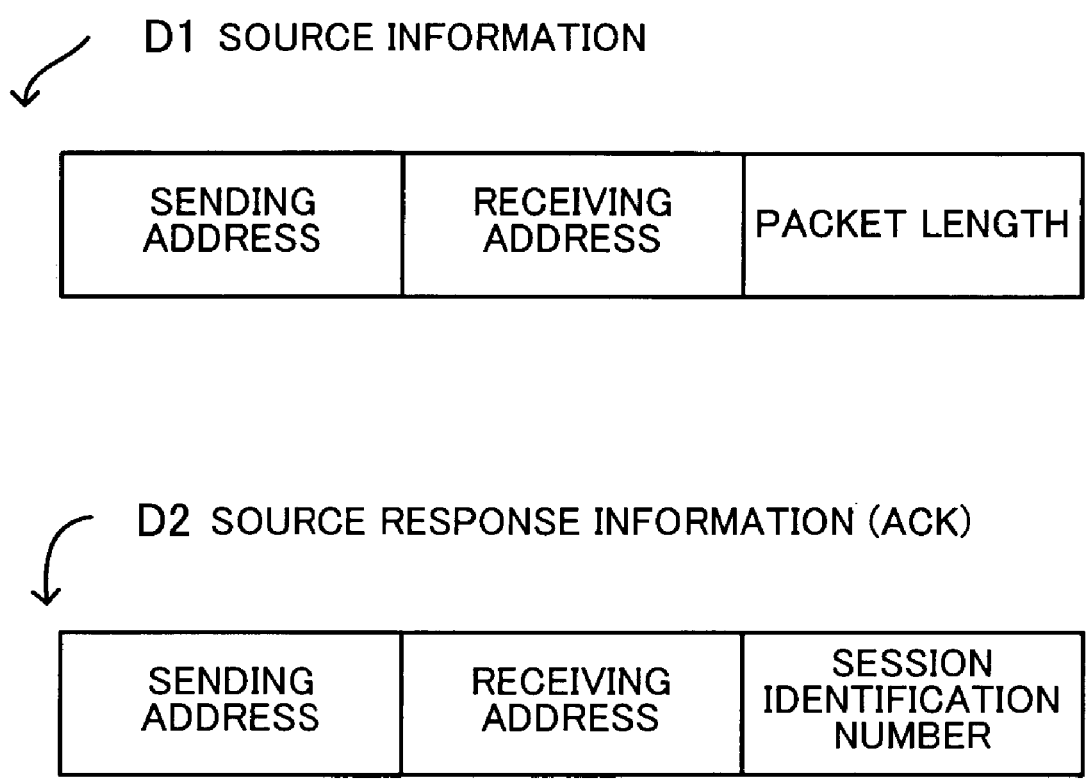
FIG. 12 shows the formats of source information and source response information.

FIG. 12 shows the formats of source information and source response information. Source information D1 includes a sending address (input line card number and input port number), a receiving address (output line card number and output port number), and packet length. Source response information D2 (ACK) includes a sending address (input line card number and input port number), a receiving address (output line card number and output port number), and a session identification number.

Figure 13:
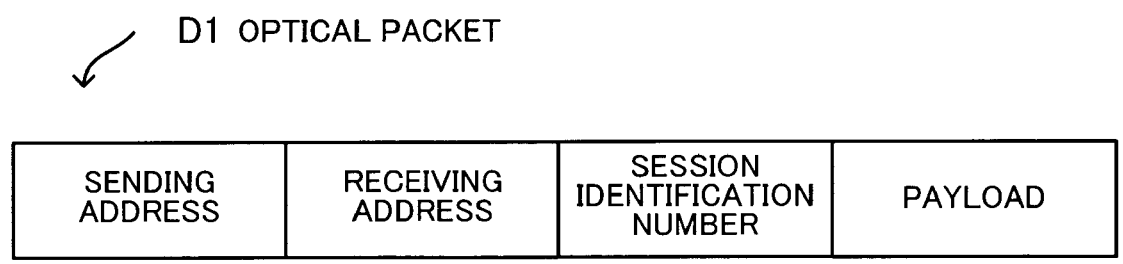
FIG. 13 shows the format of an optical packet.

FIG. 13 shows the format of an optical packet. An optical packet P includes a sending address (input line card number and input port number), a receiving address (output line card number and output port number), a session identification number, and a payload.

Figure 14:
FIG. 14 shows the format of optical packet receiving notice.

FIG. 14 shows the format of optical packet receiving notice. Optical packet receiving notice E1 includes a sending address (input line card number and input port number), a receiving address (output line card number and output port number), a session identification number, and normal/abnormal receiving.

A fault location process performed in the optical packet switching system 1 for locating a fault will now be described. As stated above, with conventional switches having one-stage SOA structure in which SOAs are arranged according to output ports, an SOA in which a malfunction occurred can be located by checking whether an optical signal can be received on the output port side. With systems like the optical packet switching system 1 in which SOAs are multistage-connected on a path along which optical packets are sent, however, faults may have occurred in a plurality of SOAs. Therefore, the simple method applied to switches having one-stage SOA structure cannot be used for locating the faults.

Moreover, in SOAs high-speed switching is performed on optical packets having a pulse width of about 100 ns. Accordingly, it is impossible to detect with a circuit, such as a PD, whether an optical packet normally passed through an SOA. If a fault occurred in some SOA, it is difficult to locate the fault.

In the fault location process performed in the optical packet switching system 1, an SOA (hereinafter referred to as a faulty SOA) in which a fault occurred is specified by monitoring information regarding port connection between input ports and output ports (ends) and analyzing this statistical information.

Description will now be given with FIG. 5 as an example. If an optical packet sent from the input port #1 cannot be outputted from the output port #1, then a fault may have occurred in the SOA 1a, 3a, or 7a. If an optical packet sent from the input port #2 can be outputted from the output port #1, then the determination that the SOA 7a is normal can be made. In addition, if an optical packet sent from the input port #1 can be outputted from the output port #2, then the determination that the SOA 1a is normal can be made. Therefore, the SOA 3a can be specified as a faulty SOA. As stated above, a faulty SOA is specified by analyzing port connection information regarding other ports and narrowing down candidate faulty SOAs.

Figure 15:
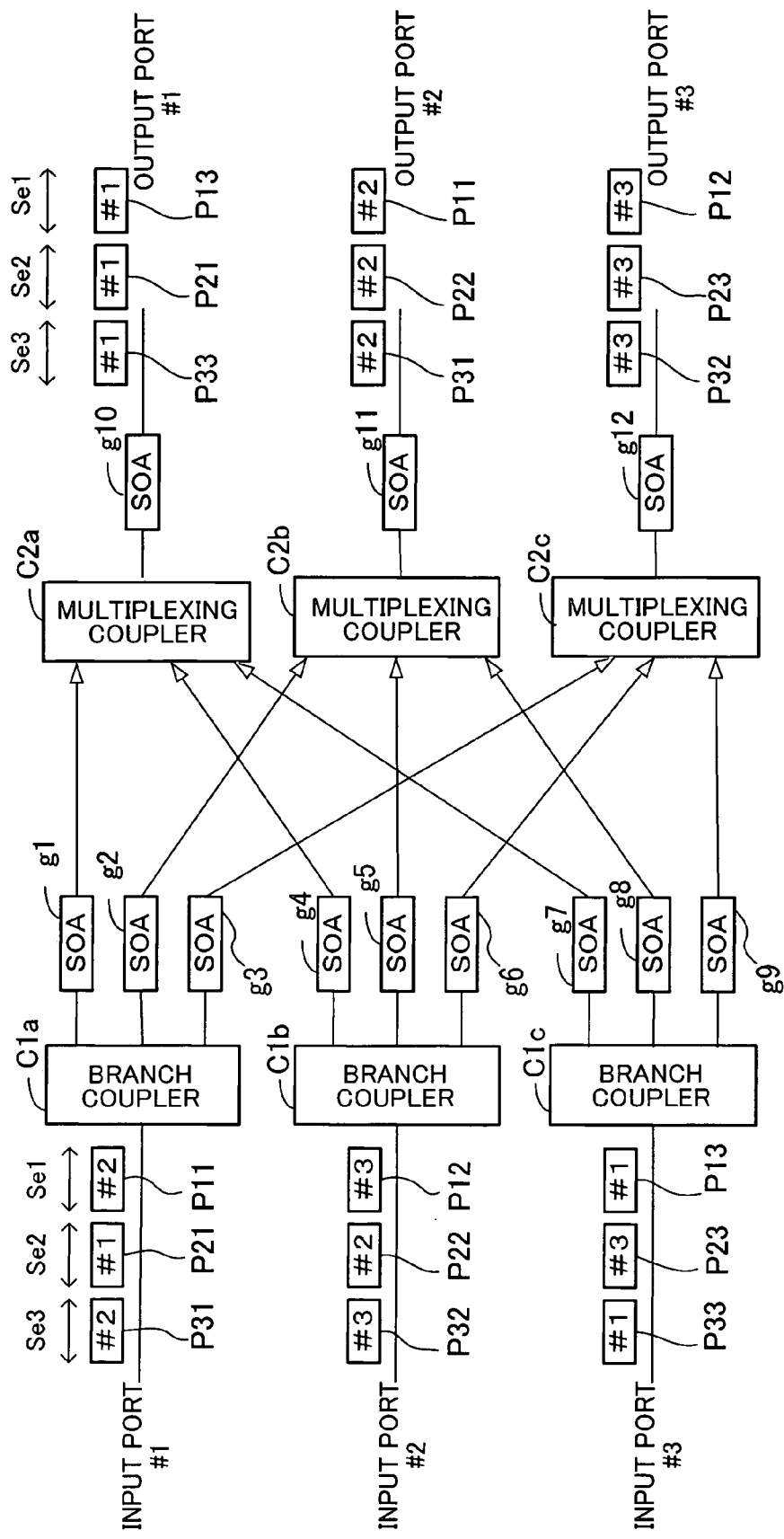
FIG. 15 is a view for describing operation performed for a fault location process.

The fault location process will now be described in further detail. FIG. 15 is a view for describing operation performed for the fault location process. An example of a model of the optical packet switching system 1 in which SOAs are multistage-connected is shown.

Input ports #1 through #3 are connected to branch couplers C1a through C1c respectively. Branch output lines of the branch coupler C1a are connected to SOAs g1 through g3 respectively. Branch output lines of the branch coupler C1b are connected to SOAs g4 through g6 respectively. Branch output lines of the branch coupler C1c are connected to SOAs g7 through g9 respectively.

Output lines of the SOAs g1, g4, and g7 are connected to a multiplexing coupler C2a. Output lines of the SOAs g2, g5, and g8 are connected to a multiplexing coupler C2b. Output lines of the SOAs g3, g6, and g9 are connected to a multiplexing coupler C2c.

An output line of the multiplexing coupler C2a is connected to an SOA g10 and an output line of the SOA g10 is connected to an output port #1. An output line of the multiplexing coupler C2b is connected to an SOA g11 and an output line of the SOA g11 is connected to an output port #2. An output line of the multiplexing coupler C2c is connected to an SOA g12 and an output line of the SOA g12 is connected to an output port #3.

optical packets P11 through P13 are inputted from the input ports #1 through #3, respectively, in a session (optical packet transfer cycle) Se1, optical packets P21 through P23 are inputted from the input ports #1 through #3, respectively, in a session Se2, and optical packets P31 through P33 are inputted from the input ports #1 through #3, respectively, in a session Se3. In FIG. 15, a # number given to each optical packet indicates the number of an output port from which it is to be outputted. For example, #2 is given to the optical packet P11, so it is to be sent to the output port #2 by switching.

If the switching function of each SOA is normal in the switching of these optical packets, then the optical packets P13, P11, and P12 are outputted from the output ports #1 through #3, respectively, in the session Se1, the optical packets P21, P22, and P23 are outputted from the output ports #1 through #3, respectively, in the session Se2, and the optical packets P33, P31, and P32 are outputted from the output ports #1 through #3, respectively, in the session Se3.

Figure 16:
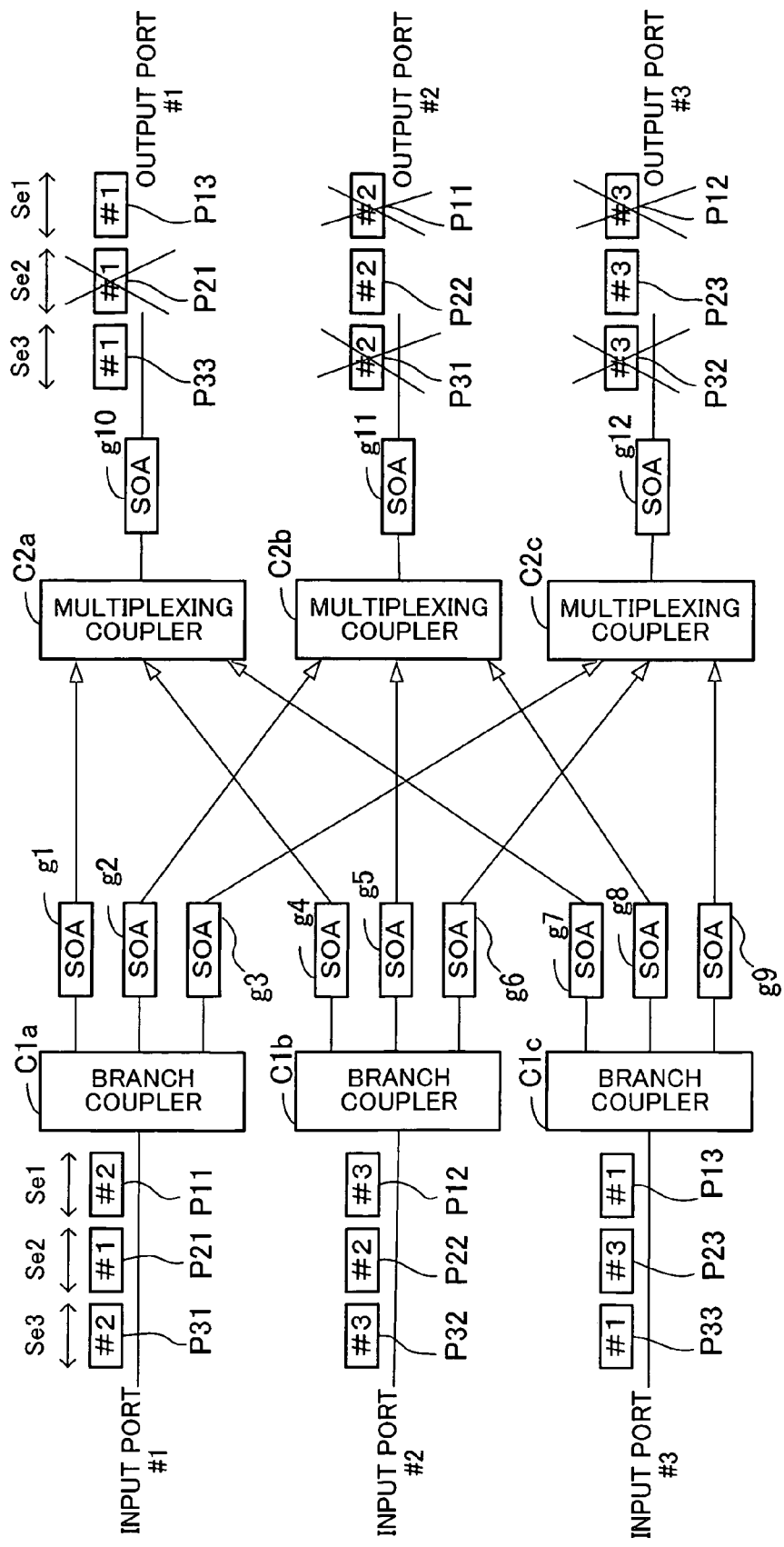
FIG. 16 shows the case where optical packets cannot be received normally.

It is assumed that the optical packets P11, P12, P21, P31, and P32 cannot be received normally in the process of this switch control. FIG. 16 shows the case where the optical packets P11, P12, P21, P31, and P32 cannot be received normally.

FIG. 17 shows a port connection information table. In the optical packet switching system 1, the port processor 12 included in the input line card 10, the port processor 22 included in the output line card 20, and the transfer path monitoring section 33 included in the switch control section 30 have a port connection information table T1. The port connection information table T1 includes information regarding port connection between input ports and output ports (ends).

The example shown in FIG. 16 can be seen from the port connection information table T1. That is to say, in the row "input port #1," the optical packet P11 sent to the output port #2 by switching is indicated in the column "session Se1," the optical packet P21 sent to the output port #1 by switching is indicated in the column "session Se2," and the optical packet P31 sent to the output port #2 by switching is indicated in the column "session Se3".

Similarly, in the row "input port #2," the optical packet P12 sent to the output port #3 by switching is indicated in the column "session Se1," the optical packet P22 sent to the output port #2 by switching is indicated in the column "session Se2," and the optical packet P32 sent to the output port #3 by switching is indicated in the column "session Se3". In the row "input port #3," the optical packet P13 sent to the output port #1 by switching is indicated in the column "session Se1," the optical packet P23 sent to the output port #3 by switching is indicated in the column "session Se2," and the optical packet P33 sent to the output port #1 by switching is indicated in the column "session Se3". In addition, the optical packets which cannot be received normally are marked with crosses in the port connection information table T1.

The fault location process is performed in the following way by using the port connection information table T1. First, an optical packet which cannot be outputted from the output port #1 is the optical packet P21. In this case, the SOAs g10 and g1 are candidate faulty SOAs. However, the optical packets P13 and P33 can be outputted from the output port #1, so the SOA g10 is normal. As a result, the determination that the SOA g1 is a faulty SOA can be made.

Optical packets which cannot be outputted from the output port #2 are the optical packets P11 and P31. In this case, the SOAs g11 and g2 are candidate faulty SOAs. However, the optical packet P22 can be outputted from the output port #2, so the SOA g11 is normal. As a result, the determination that the SOA g2 is a faulty SOA can be made.

Optical packets which cannot be outputted from the output port #3 are the optical packets P12 and P32. In this case, the SOAs g12 and g6 are candidate faulty SOAs. However, the optical packet P23 can be outputted from the output port #3, so the SOA g12 is normal. As a result, the determination that the SOA g6 is a faulty SOA can be made.

Therefore, if the optical packets P11, P12, P21, P31, and P32 cannot be received normally, then the SOAs g1, g2, and g6 can be identified as faulty SOAs. Such a fault location process is performed by the transfer path monitoring section 33 included in the switch control section 30.

The drive control of a faulty SOA will now be described. In most cases, a reduction in the intensity of output due to degradation over time causes a fault in an SOA. Therefore, after a faulty SOA is located by performing the above fault location process, the drive control section 32 included in the switch control section 30 exercises fault recovery control over the faulty SOA by increasing drive current sent thereto.

Figure 18:
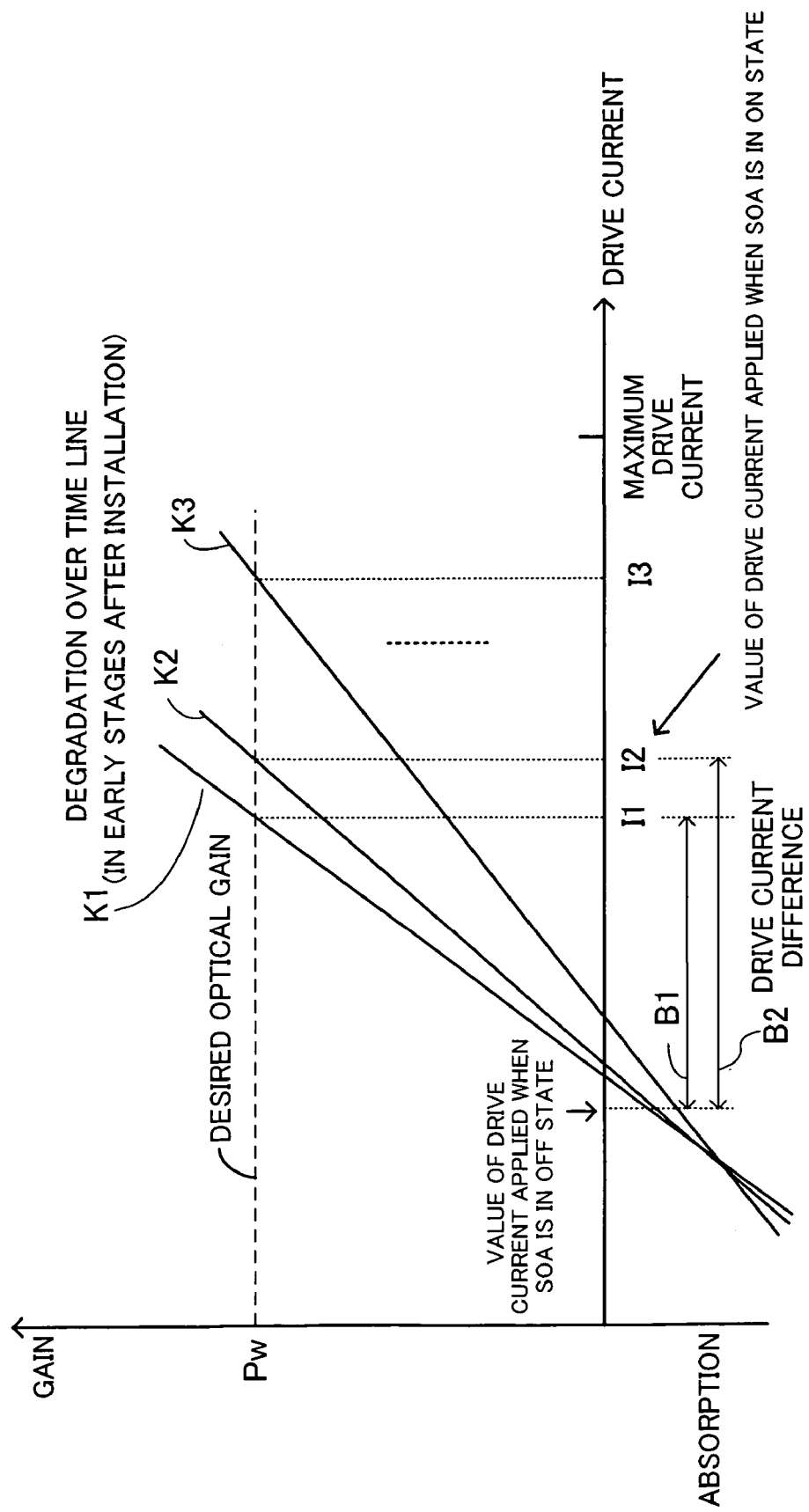
FIG. 18 shows the degradation over time characteristics of an SOA.

FIG. 18 shows the degradation over time characteristics of an SOA. In FIG. 18, a vertical axis indicates the gain (output power) of an SOA and a horizontal axis indicates drive current. A degradation over time line K1 indicates the degradation over time characteristic of the SOA in the early stages after system installation.

As can be seen from FIG. 18, drive current I1 should be applied in order to obtain desired optical gain Pw from the SOA having characteristics indicated by the degradation over time line K1. In this case, a drive current difference (difference between drive current applied when the SOA is in the OFF state and drive current applied when the SOA is in the ON state) is B1.

It is assumed that operating the switching system for a certain period of time promotes degradation over time of the SOA and that the characteristics of the SOA shift from the degradation over time line K1 to a degradation over time line K2. In order to obtain the desired optical gain Pw from the SOA having characteristics indicated by the degradation over time line K2 (in order to normally put the SOA into the ON state), drive current I2 should be applied. Accordingly, a drive current difference increases to B2.

In an environment in which the drive current I1 is applied to perform switching by SOA gating, a fault occurs in an SOA and the faulty SOA is located by performing a fault location process. At this time, the characteristics of the faulty SOA are considered to have deteriorated into the degradation over time line K2, and fault recovery can be performed on the faulty SOA by applying the drive current I2.

How long after the beginning of the operation of the system the degradation over time of an SOA occurs in, that is to say, how a degradation over time line shifts from K1, through K2, to K3 can be predicted from the characteristics of the SOA.

As a result, when the characteristics of the SOA correspond to one of these degradation over time lines, a drive current value required to obtain the desired optical gain Pw from the SOA is known. Accordingly, a plurality of drive current values are stored in a memory in advance. When a faulty SOA is located, drive current which is one level more powerful than drive current currently outputted is applied to perform fault recovery.

However, even if drive current applied to the faulty SOA is increased to a maximum value, the fault may not be eliminated (notice from the transfer path monitoring section 33 that the SOA in question is a faulty SOA may not be canceled). In this case, the determination that the SOA in question is damaged can be made. As a result, the switch control section 30 gives the alarm that the SOA in question is damaged (by, for example, making a corresponding LED on a panel light or informing an operator via the maintenance terminal or the like).

Figure 19:
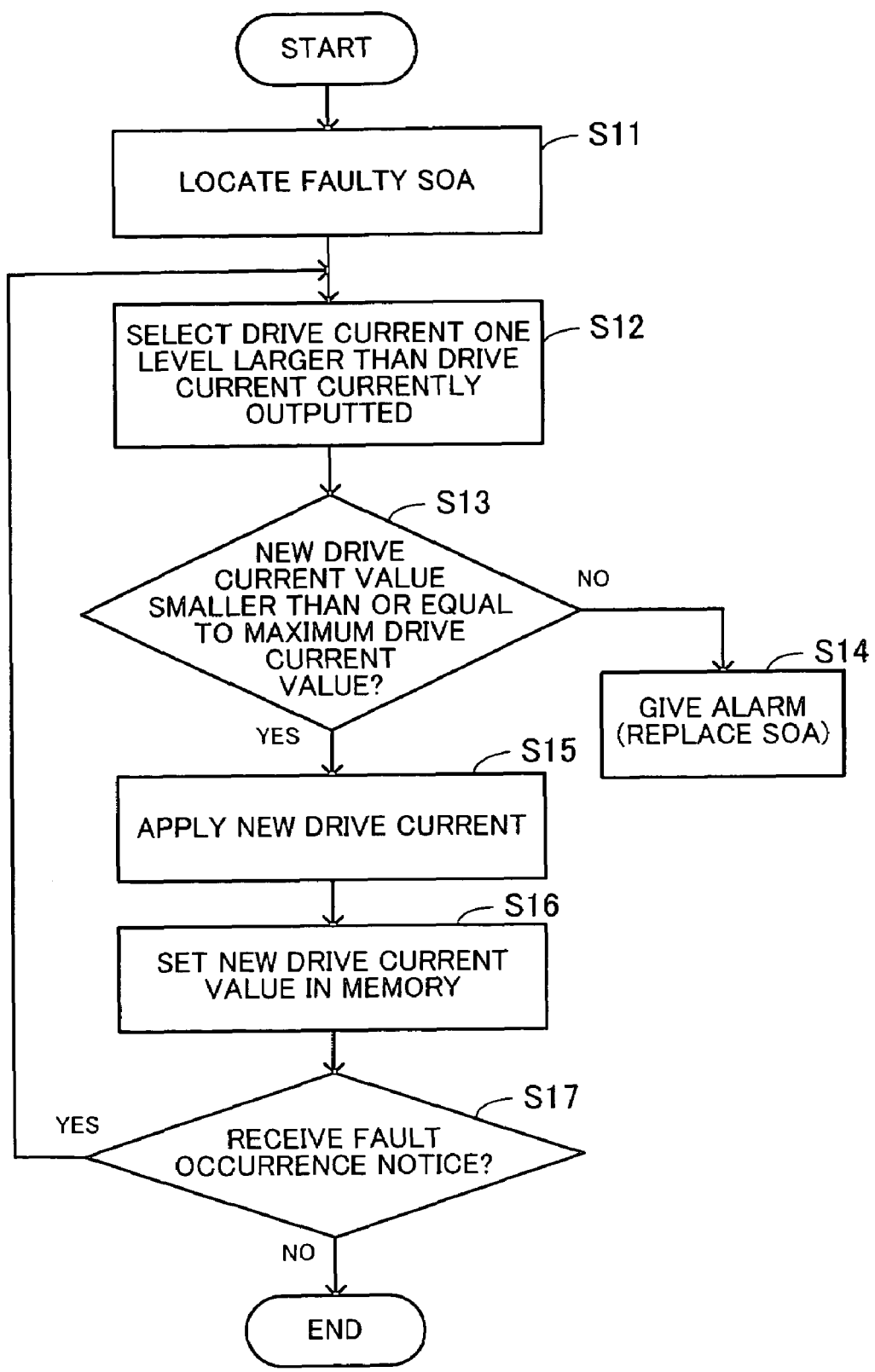
FIG. 19 is a flow chart showing the operation of exercising drive control over an SOA.

FIG. 19 is a flow chart showing the operation of exercising drive control over an SOA.

[S11] The transfer path monitoring section 33 performs a fault location process to locate a faulty SOA.

[S12] The drive control section 32 reads and selects drive current one level more powerful than drive current currently outputted from a memory.

[S13] The drive control section 32 compares the new drive current value selected and a maximum drive current value. If the new drive current value is greater than the maximum drive current value, then step S14 is performed. If the new drive current value is smaller than or equal to the maximum drive current value, then step S15 is performed.

[S14] The integrated management section 34 makes not the determination that the intensity of output from the faulty SOA has dropped due to degradation over time, but the determination that the faulty SOA is damaged and gives the alarm (the SOA (a board on which the faulty SOA is mounted) is replaced by an operator).

[S15] The drive control section 32 applies the new drive current to the faulty SOA.

[S16] The drive control section 32 sets the new drive current value selected in the memory as a current drive current value.

[S17] If the drive control section 32 receives fault occurrence notice, then the procedure returns to step S12. If the drive control section 32 does not receive fault occurrence notice, then the drive control section 32 considers that the faulty SOA has recovered, and terminates the drive control.

A fault location process which covers a fault in the input line card, the output line card, or optical fiber cables will now be described by using FIGS. 20 and 21. In the above example, the location of a faulty SOA and fault recovery are described with the case where a fault occurs in the SOA as an example. Actually, however, a fault may occur in the input line card, the output line card, or optical fiber cables (cable disconnection). Therefore, it is important that such a fault can also be located.

Figure 20:
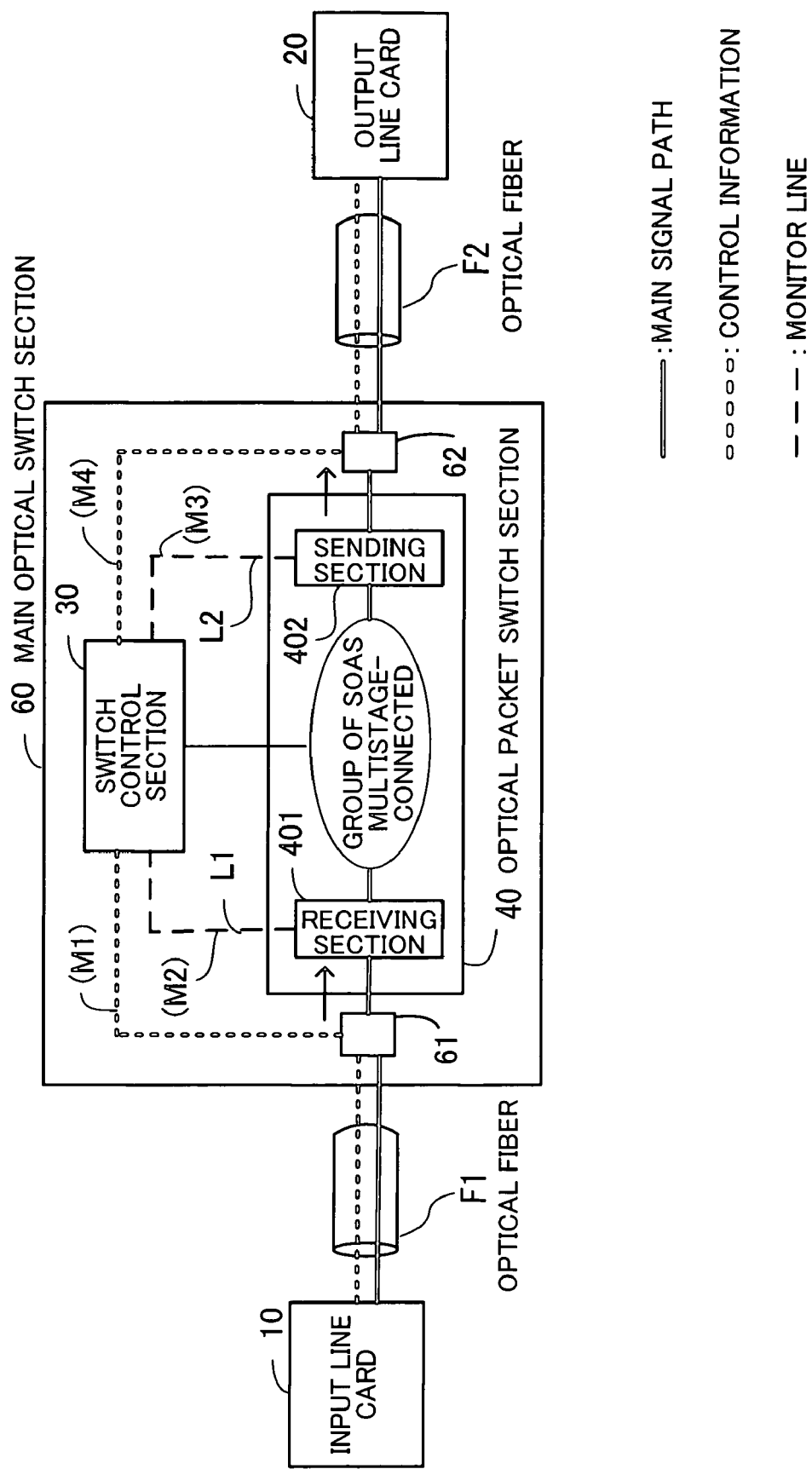
FIG. 20 shows how components in the optical packet switching system are connected.

FIG. 20 shows how components in the optical packet switching system 1 are connected. A main optical switch section 60 includes the switch control section 30, the optical packet switch section 40, and optical taps 61 and 62. The optical packet switch section 40 includes a receiving section 401, a sending section 402, and a group of SOAs multistage-connected.

The input line card 10 and the main optical switch section 60 are connected by an optical fiber F1. The output line card 20 and the main optical switch section 60 are connected by an optical fiber F2. Two logical paths, that is to say, a main signal path and a control information path run through the physical optical fiber F1 and the input line card 10 and the main optical switch section 60 communicate with each other. Similarly, the two logical paths, that is to say, the main signal path and the control information path run through the physical optical fiber F2 and the output line card 20 and the main optical switch section 60 communicate with each other.

The main signal path is a path along which optical packets flow, and the control information path is a path along which control information, such as a port connection request, flows (different wavelengths are used on the main signal path and the control information path).

The optical tap 61 makes the main signal path which runs through the optical fiber F1 branch to the optical packet switch section 40 and makes the control information path which runs through the optical fiber F1 branch to the switch control section 30. The optical tap 62 multiplexes the main signal path from the optical packet switch section 40 and the control information path from the switch control section 30. A composite path is outputted to the output line card 20 via the optical fiber F2. The receiving section 401 receives an optical packet which flows along the main signal path and the sending section 402 sends the optical packet along the main signal path.

The transfer path monitoring section 33 included in the switch control section 30 monitors the intensity of the optical packet, which flows along the main signal path and which is received by the receiving section 401, by a monitor line L1 and monitors the intensity of the optical packet, which is sent along the main signal path by the sending section 402, by a monitor line L2.

FIG. 21 shows a fault location table. The transfer path monitoring section 33 included in the switch control section 30 has a fault location table T2. The transfer path monitoring section 33 monitors the intensity of the optical packet which passes through the receiving section 401 and the sending section 402 along the main signal path and the intensity of control information which flows along the control information path, and generates the fault location table T2.

The fault location table T2 includes Monitored Control Information Path State on Input Line Card Side (M1), Monitored Receiving Section State (M2), Monitored Sending Section State (M3), Monitored Control Information Path State on Output Line Card Side (M4), and Decision (A) fields.

If control information from the input line card 10 can be received, then the Monitored Control Information Path State on Input Line Card Side (M1) field is set to "Good (○)". If the control information from the input line card 10 cannot be received, then the Monitored Control Information Path State on Input Line Card Side (M1) field is set to "Faulty (×)".

If the intensity of an optical packet sent from the input line card 10 along the main signal path satisfies a desired level, then the Monitored Receiving Section State (M2) field is set to "Good (○)". If the intensity of the optical packet sent from the input line card 10 along the main signal path does not satisfy the desired level, then the Monitored Receiving Section State (M2) field is set to "Faulty (×)".

If the intensity of an optical packet to be sent to the output line card 20 along the main signal path satisfies a desired level, then the Monitored Sending Section State (M3) field is set to "Good (○)". If the intensity of the optical packet to be sent to the output line card 20 along the main signal path does not satisfy the desired level, then the Monitored Sending Section State (M3) field is set to "Faulty (×)".

If control information from the output line card 20 can be received, then the Monitored Control Information Path State on Output Line Card Side (M4) field is set to "Good (○)". If the control information from the output line card 20 cannot be received, then the Monitored Control Information Path State on Output Line Card Side (M4) field is set to "Faulty (×)".

[State ST1] If all of the Monitored Control Information Path State on Input Line Card Side (M1), Monitored Receiving Section State (M2), Monitored Sending Section State (M3), and Monitored Control Information Path State on Output Line Card Side (M4) fields are set to "○," then the input line card 10, the output line card 20, and the optical fibers F1 and F2 can be considered to be normal. Therefore, if an optical packet is not outputted from a predetermined output port in such conditions, then it is conceivable that a fault has occurred in an SOA, and the Decision (A) field is set to "SOA Fault Location Process" (the fault location process described in FIGS. 15 through 17 is performed).

[State ST2] If the Monitored Control Information Path State on Input Line Card Side (M1), Monitored Receiving Section State (M2), Monitored Sending Section State (M3), and Monitored Control Information Path State on Output Line Card Side (M4) fields are set to "○," "○," "×," and "○" respectively, then the input line card 10, the output line card 20, and the optical fibers F1 and F2 can be considered to be normal. Therefore, if an optical packet is not outputted from a predetermined output port in such conditions, then it is conceivable that a fault has occurred in an SOA, and the Decision (A) field is set to "SOA Fault Location Process".

[State ST3] If the Monitored Control Information Path State on Input Line Card Side (M1), Monitored Receiving Section State (M2), Monitored Sending Section State (M3), and Monitored Control Information Path State on Output Line Card Side (M4) fields are set to "○," "○," "○," and "×" respectively, then the input line card 10, the output line card 20, and the optical fiber F1 can be considered to be normal and the optical fiber F2 can be considered to be abnormal. Accordingly, the Decision (A) field is set to "Disconnection of Optical Fiber F2".

[State ST4] If the Monitored Control Information Path State on Input Line Card Side (M1), Monitored Receiving Section State (M2), Monitored Sending Section State (M3), and Monitored Control Information Path State on Output Line Card Side (M4) fields are set to "×," "×," "○," and "○" respectively, then the input line card 10, the output line card 20, and the optical fiber F2 can be considered to be normal and the optical fiber F1 can be considered to be abnormal. Accordingly, the Decision (A) field is set to "Disconnection of Optical Fiber F1".

[State ST5] If the Monitored Control Information Path State on Input Line Card Side (M1), Monitored Receiving Section State (M2), Monitored Sending Section State (M3), and Monitored Control Information Path State on Output Line Card Side (M4) fields are set to "○," "×," "○," and "○" respectively, then the output line card 20 and the optical fibers F1 and F2 can be considered to be normal and the input line card 10 can be considered to be abnormal. Accordingly, the Decision (A) field is set to "Fault in Input Line Card 10".

As stated above, if the transfer path monitoring section 33 detects communication trouble at the time of system operation, then a fault location process covering faults in the input line card, the output line card, and the optical fiber cables is performed first (coarse fault detection is performed first). If the decision that there is a fault in an SOA is made, then a finer fault location process like that described in FIGS. 15 through 17 is performed on the SOAs included in the optical packet switch section 40 to narrow down candidate faulty SOAs and locate a faulty SOA. Fault recovery is then performed by controlling drive current applied to the faulty SOA (or by urging an operator to unit replacement by giving the alarm).

As a result, even in a large-scale switching system with many ports including SOAs multistage-connected on a path along which optical packets flow, that is to say, including many devices in which a fault may occur, a fault can be detected efficiently. This improves not only the reliability of operation but also convenience in the management of system operation.

Figure 22:
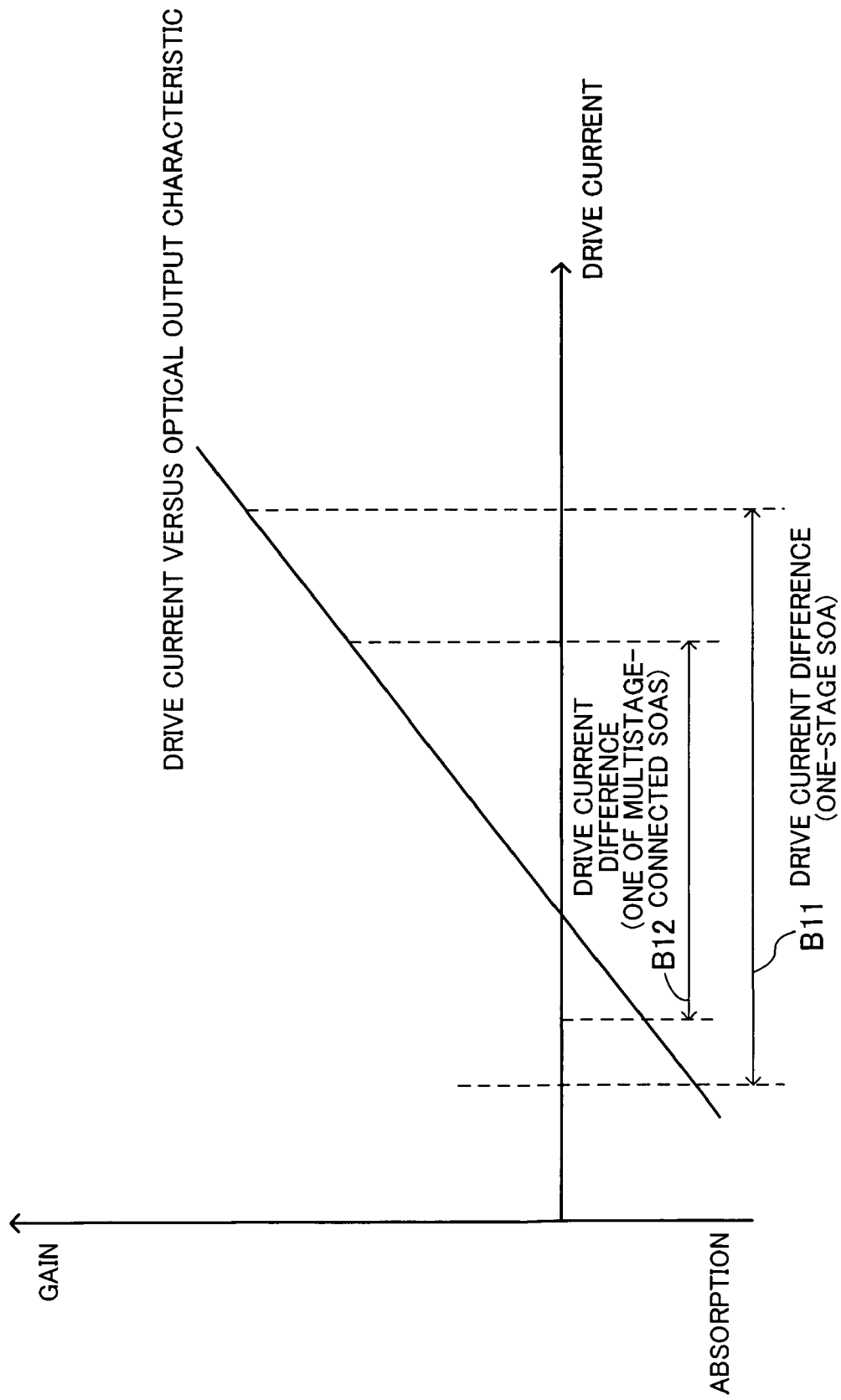
FIG. 22 shows the relationship between the drive current and optical output of an SOA.

High-speed operation of the optical packet switching system 1 will now be described. FIG. 22 shows the relationship between the drive current and optical output of an SOA. In FIG. 22, a vertical axis indicates gain, a horizontal axis indicates drive current, and the drive current versus optical output characteristic of an SOA is shown. B11 is a drive current difference for an SOA included in a conventional system having one-stage SOA structure and B12 is a drive current difference for one of multistage-connected SOAs included in the optical packet switching system 1.

Figure 26:
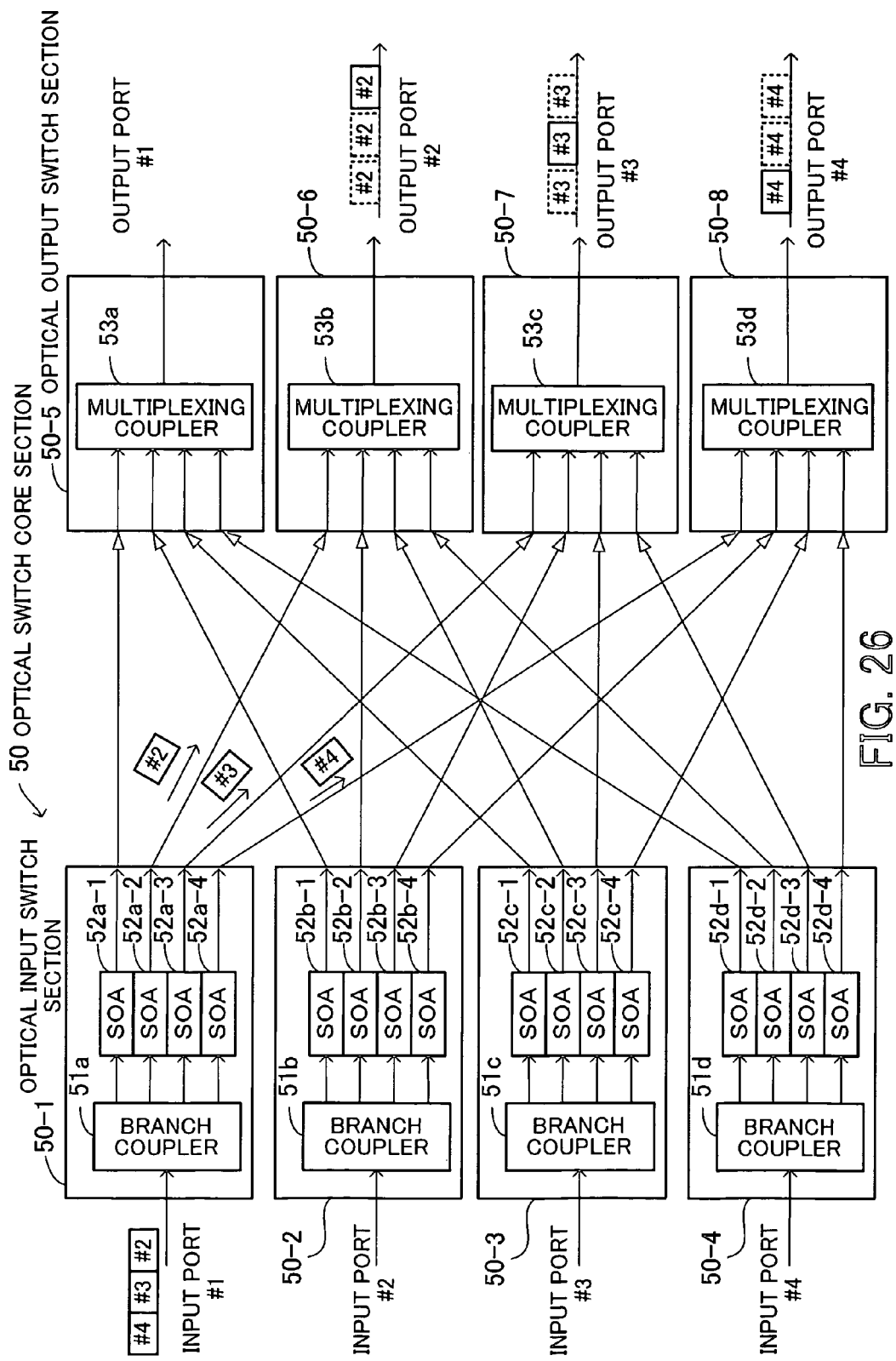
FIG. 26 shows a conventional optical switch core section including SOAs.

In a conventional system like that described in FIG. 26, switching is performed by using a single SOA. Therefore, to compensate for branch loss which occurs in a branch coupler, an SOA in the ON state must produce output power at high gain. In addition, to reduce a crosstalk component, an SOA in the OFF state must absorb a larger quantity of light and reduce a noise component.

Accordingly, the drive current difference B11 for an SOA must be made great. As a result, the amount of power consumed increases and it is difficult for an SOA to perform high-speed switching operation.

On the other hand, in the optical packet switching system 1 SOAs are multistage-connected on a path along which optical packets flow. Therefore, branch loss which occurs in a first branch coupler is compensated for by amplification by an SOA at the first stage. Output from the SOA at the first stage is sent to a second branch coupler. Branch loss which occurs in the second branch coupler is compensated for by amplification by an SOA at the second stage.

That is to say, a drop in an optical level caused by a branch coupler is compensated for by amplification by an SOA. This is repeated and switching is performed. Therefore, compared with the conventional system, the value of drive current required to put a single SOA into the ON state is small.

In addition, in the optical packet switching system 1 SOAs on non-selected paths go into the OFF state and noise components are combined by a multiplexing coupler. However, an SOA at the final stage which is on the output side of the multiplexing coupler goes into the OFF state. This eliminates accumulated noise. Accordingly, unlike conventional systems, an SOA in the OFF state need not absorb a larger quantity of light to reduce a noise component. As a result, the drive current difference B12 for an SOA included in the optical packet switching system 1 can be made smaller than the drive current difference B11. Therefore, the amount of power consumed can be reduced and an SOA can perform high-speed switching operation.

Figure 23:
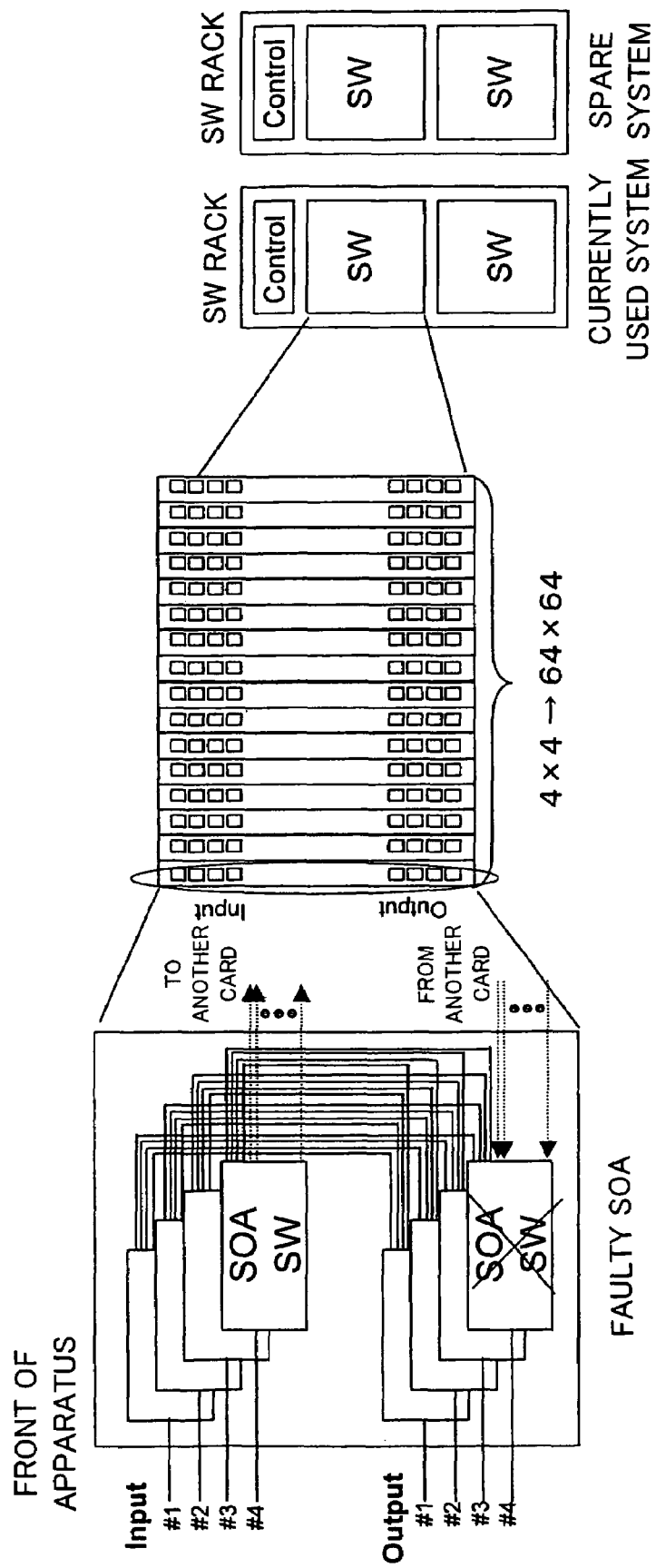
FIG. 23 shows an example of how to mount the optical packet switching system.
Figure 24:
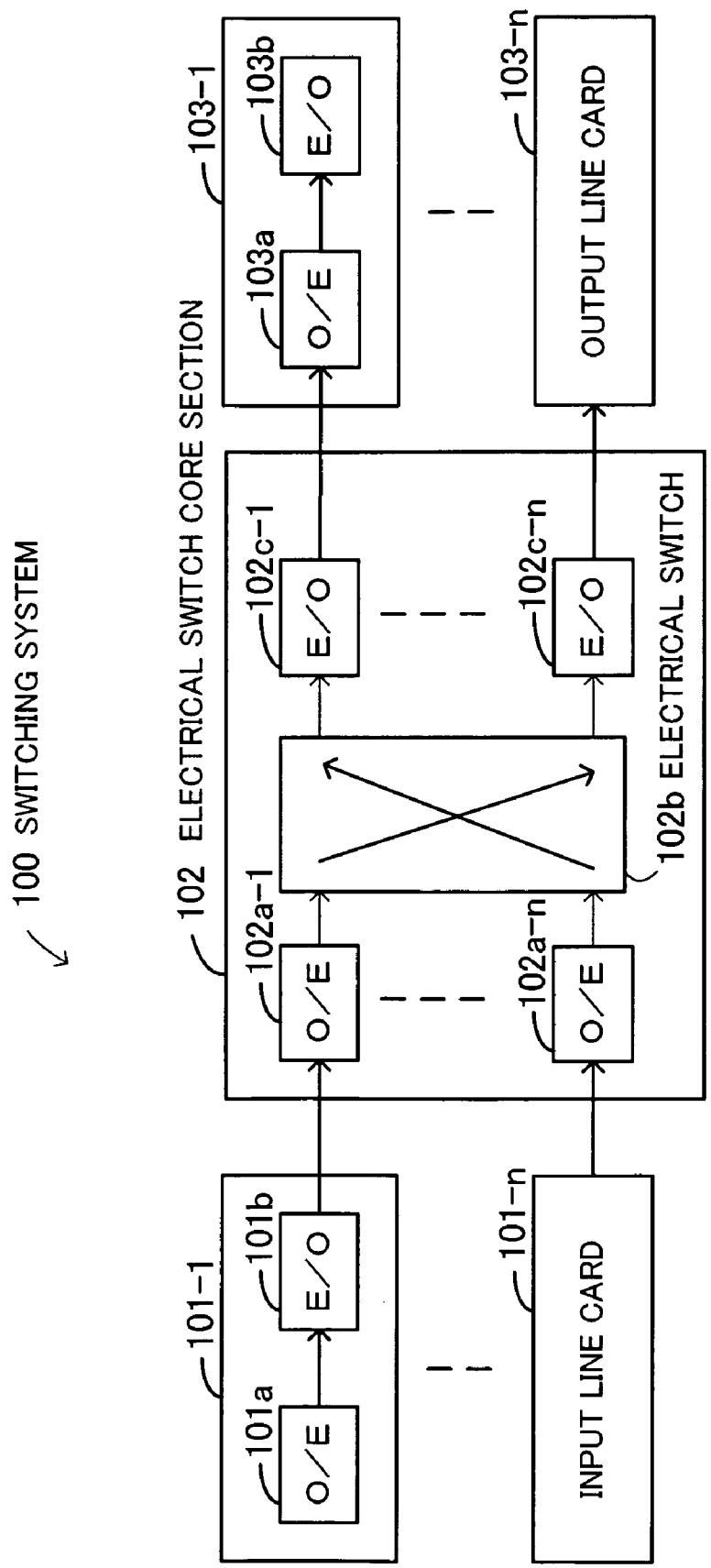
FIG. 24 shows a conventional switching system in which electrical switching is performed.
Figure 25:
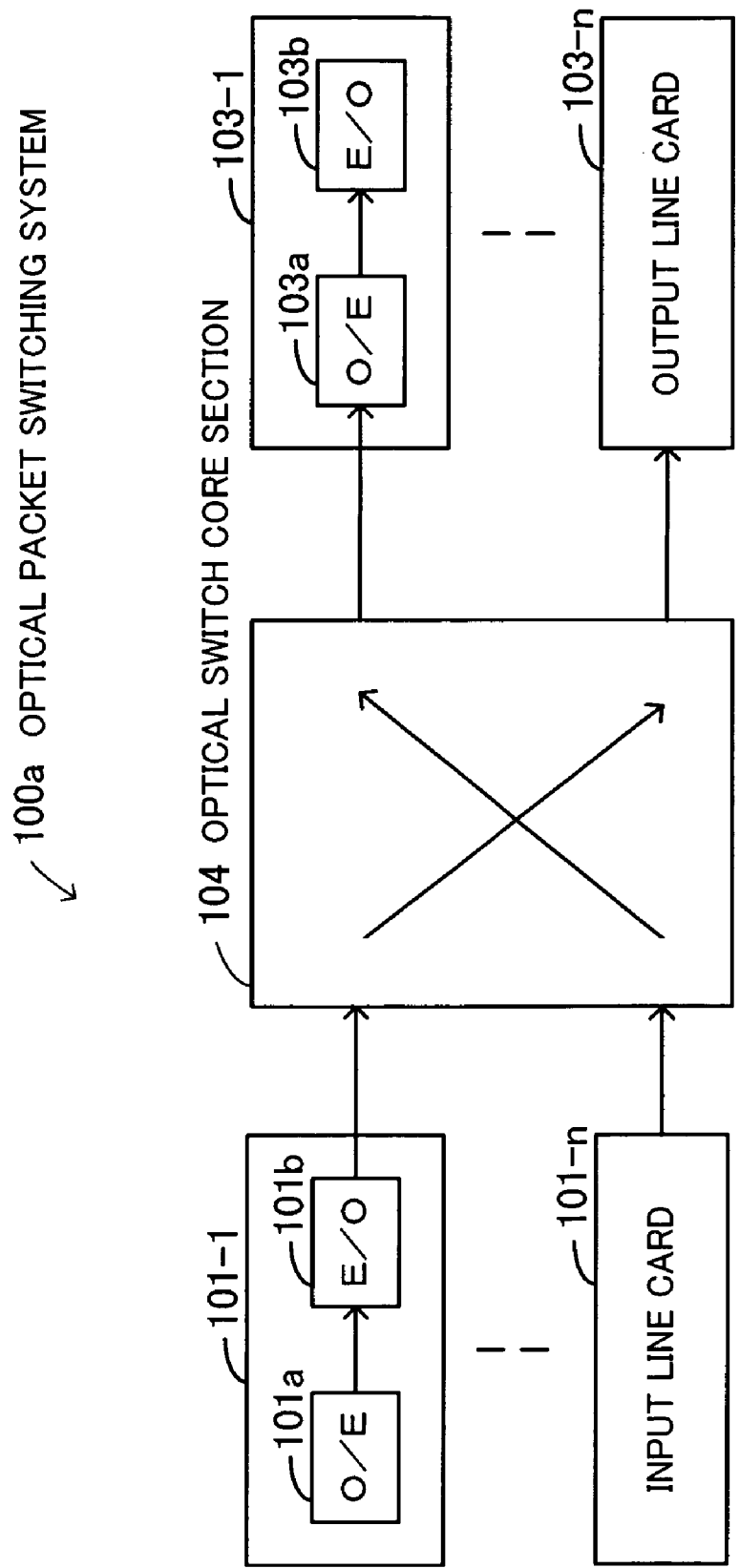
FIG. 25 shows an optical packet switching system.

How to mount the optical packet switching system 1 will now be described. FIG. 23 shows an example of how to mount the optical packet switching system 1. There are an SW rack for a currently used system and an SW rack for a spare system. For example, one switch control section 30 ("Control" in FIG. 23) and two switch sections SW each including the function of the optical packet switch section 40 are mounted in each SW rack.

Each switch section SW is an N×N switch card. To build a large-scale switching system having a larger number of ports, M N×N switch cards should be connected.

In FIG. 23, one switch card corresponds to 4×4 switch having four input ports and four output ports. In this example, a 64×64 switching system having many ports is formed by connecting sixteen switch cards on a back board.

As stated above, the optical packet switching system 1 having many ports is formed by mounting a plurality of switch cards each having a small number of ports in each rack. By adopting such structure, a user can freely increase or decrease the number of ports and flexibility in operating the system can be improved.

Moreover, by building the system by using a plurality of switch cards, work for fault recovery can be performed easily. That is to say, if there is a faulty SOA (damaged SOA), the switch control section 30 informs an operator via the maintenance terminal about a switch card where a fault has occurred. Therefore, the operator can easily perform fault recovery by replacing the switch card where a fault has occurred.

As has been described in the foregoing, with the broadcast-select optical packet switching system 1 using SOAs, SOA elements are multistage-connected. This enables an increase in the number of ports while maintaining a desired light intensity level and OSNR. Moreover, unlike conventional systems, the number of ports is not limited by factors, such as a crosstalk component and an OSNR, so a large-scale optical packet switching system having many ports can be built.

In addition, by adopting multistage structure, an extinction ratio requirement for each stage is relaxed. Accordingly, an SOA is biased in advance to send drive current thereto. By doing so, the SOA can operate at a high speed. As a result, a high-speed switch (high-speed switching in the order of nanoseconds) can be realized.

Moreover, by performing fault detection at the optical packet level in cooperation with an upper layer, only an SOA in which a fault has occurred can be disconnected. As a result, the influence of the fault on other ports operated can be avoided.

The optical packet switching system 1 having the above features is widely applicable in the field of wide band optical communication, such as communication between ultra high performance computers (UHPCs) and signal switching by high-speed routers.

In the optical packet switching system according to the present invention, semiconductor optical amplifiers are included as gate switches multistage-connected on paths along which an optical packet are transmitted, and optical packet switching is performed by broadcasting the optical packet to a plurality of gate switches, by selecting the optical packet by ON/OFF gating operation of the gate switches, and by absorbing noise signals which flow along non-selected paths by putting gate switches at a final stage into the OFF state. This prevents a crosstalk component from adjacent ports from increasing and prevents an OSNR from degradation. Therefore, transmission quality and reliability in optical packet switching control can be improved.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical packet switching system for performing optical packet transmission, the system comprising:
   input line cards for generating port connection requests for connecting input ports and output ports and for sending optical packets;
   an optical packet switch section including semiconductor optical amplifiers as gate switches multistage-connected on paths along which the optical packets sent from the input line cards are transmitted for performing optical packet switching by broadcasting the optical packets to a plurality of gate switches, by selecting the optical packets by ON/OFF gating operation of the gate switches, and by absorbing noise signals which flow along non-selected paths by putting gate switches at a final stage into the OFF state;
   a switch control section for exercising centralized control over the optical packet switching, and for exercising ON/OFF drive control over the gate switches in the optical packet switch section on the basis of the port connection requests so as to generate requested paths; and
   output line cards for receiving the optical packets sent by the switching and for outputting the optical packets from output ports.

2. The optical packet switching system according to claim 1, wherein:
the optical packet switch section includes:
a branch switch section including branch couplers and branching-side gate switches, and
a multiplexing switch section including multiplexing couplers and multiplexing-side gate switches;
branch loss caused by the branch couplers is compensated for by the branching-side gate switches which amplify and output the optical packets at the time of being in the ON state; and
the noise signals which flow along the non-selected paths and which are accumulated by the multiplexing couplers are absorbed by putting the multiplexing-side gate switches, being the gate switches at the final stage, into the OFF state.

3. The optical packet switching system according to claim 1, wherein:
the switch control section performs at least one of port connection request handling, an optical packet switching path monitoring process including a fault detection function, and a gate switch driving process as a centralized control function;
each of the input line cards and the output line cards includes a port processor for exchanging control information regarding the optical packet switching with the switch control section; and
the input line cards, the output line cards, and the switch control section recognize a switching path of a current optical packet independently of one another.

4. The optical packet switching system according to claim 1, wherein when the switch control section recognizes the occurrence of a fault during system operation, the switch control section locates one of the input line cards, one of the output line cards, an optical fiber which connects the input line cards and the optical packet switch section, an optical fiber which connects the output line cards and the optical packet switch section, or a gate switch in the optical packet switch section where the fault has occurred by monitoring light intensity on each of a main signal path along which the optical packets flow and a control information path along which control information flows.

5. The optical packet switching system according to claim 4, wherein the switch control section monitors all information regarding port connection between input ports and output ports, analyzes, in the case of recognizing that the fault has occurred in a gate switch in the optical packet switch section, the information regarding port connection, narrows down candidate faulty gate switches by removing a path along which an optical packet can be sent from paths on which a plurality of candidate faulty gate switches are placed, and locates the gate switch in which the fault has occurred.

6. The optical packet switching system according to claim 4, wherein the switch control section stores in advance a plurality of drive current values corresponding to gate switch degradation over time, selects, in the case of the gate switch in which the fault has occurred being located, drive current obtained by increasing drive current currently outputted step by step, and performs fault recovery by applying the selected drive current to the gate switch in which the fault has occurred.

7. The optical packet switching system according to claim 6, wherein when the switch control section recognizes from a degradation over time characteristic that a current value greater than a maximum drive current of the gate switch is required to obtain desired light intensity as output of the gate switch, the switch control section considers the gate switch in which the fault has occurred to have been damaged, and gives alarm notice to the outside.

8. The optical packet switching system according to claim 1, wherein the switch control section makes the optical packet switch section perform the gating operation at a speed higher than the speed of gating by a single gate switch by applying drive current a current difference for which is smaller than a current difference for drive current applied if the single gate switch is placed on each path in the optical packet switch section along which the optical packets are transmitted to the gate switches multistage-connected on the paths along which the optical packets are transmitted.

9. An optical packet switching apparatus for performing optical packet transmission, the apparatus comprising:
branch sections for making input optical packets branch and for broadcasting the optical packets to switching elements at a next stage;
branching-side gate switches which are semiconductor optical amplifiers multistage-connected on paths along which the optical packets are transmitted, which perform ON/OFF gating operation, and which go into the ON state in the case of selecting the broadcast optical packets to amplify and output the optical packets;
multiplexing sections for multiplexing the optical packets outputted from the branching-side gate switches and noise signals outputted from the branching-side gate switches in the OFF state; and
multiplexing-side gate switches which are semiconductor optical amplifiers multistage-connected on paths along which the optical packets are transmitted, which perform ON/OFF gating operation, which go into the ON state in the case of selecting the optical packets outputted from the multiplexing sections, and which go into the OFF state in the case of receiving the noise signals which flow along non-selected path and which are accumulated by the multiplexing sections to absorb the noise signals.

10. An optical packet switching method for performing switching on optical packets, the method comprising the steps of:
generating, with input line cards, port connection requests for connecting input ports and output ports and sending the optical packets;
forming an optical packet switch section including semiconductor optical amplifiers as gate switches multistage-connected on paths along which the optical packets sent from the input line cards are transmitted;
broadcasting the optical packets to a plurality of gate switches and selecting the optical packets by ON/OFF gating operation of the gate switches;
absorbing noise signals which flow along non-selected paths by putting gate switches at a final stage into the OFF state;
exercising centralized control over optical packet switching, and exercising ON/OFF drive control over the gate switches in the optical packet switch section on the basis of the port connection requests so as to generate requested paths; and
receiving, with output line cards, the optical packets sent by the switching, and outputting the optical packets from output ports.

11. The optical packet switching method according to claim 10, wherein:
the optical packet switch section includes:
a branch switch section including branch couplers and branching-side gate switches, and a multiplexing switch section including multiplexing couplers and multiplexing-side gate switches;

branch loss caused by the branch couplers is compensated for by the branching-side gate switches which amplify and output the optical packets at the time of being in the ON state; and the noise signals which flow along the non-selected paths and which are accumulated by the multiplexing couplers are absorbed by putting the multiplexing-side gate switches, being the gate switches at the final stage, into the OFF state.

12. The optical packet switching method according to claim 10, wherein:

a control section for performing at least one of port connection request handling, an optical packet switching path monitoring process including a fault detection function, and a gate switch driving process as a centralized control function is used;

each of the input line cards and the output line cards includes a port processor for exchanging control information regarding the optical packet switching with the control section; and the input line cards, the output line cards, and the control section recognize a switching path of a current optical packet independently of one another.

13. The optical packet switching method according to claim 10, further comprising the step of locating, at the time of recognizing the occurrence of a fault during system operation, one of the input line cards, one of the output line cards, an optical fiber which connects the input line cards and the optical packet switch section, an optical fiber which connects the output line cards and the optical packet switch section, or a gate switch in the optical packet switch section where the fault has occurred by monitoring light intensity on each of a main signal path along which the optical packets flow and a control information path along which control information flows.

14. The optical packet switching method according to claim 13, further comprising the steps of:

monitoring all information regarding port connection between input ports and output ports;

analyzing, in the case of recognizing that the fault has occurred in a gate switch in the optical packet switch section, the information regarding port connection;

narrowing down candidate faulty gate switches by removing a path along which an optical packet can be sent from paths on which a plurality of candidate faulty gate switches are placed; and locating the gate switch in which the fault has occurred.

15. The optical packet switching method according to claim 13, further comprising the steps of:

storing in advance a plurality of drive current values corresponding to gate switch degradation over time;

selecting, in the case of the gate switch in which the fault has occurred being located, drive current obtained by increasing drive current currently outputted step by step; and performing fault recovery by applying the selected drive current to the gate switch in which the fault has occurred.

16. The optical packet switching method according to claim 15, further comprising the steps of:

considering, at the time of recognizing from a degradation over time characteristic that a current value greater than a maximum drive current of the gate switch is required to obtain desired light intensity as output of the gate switch, the gate switch in which the fault has occurred to have been damaged; and giving alarm notice to the outside.

17. The optical packet switching method according to claim 10, wherein the optical packet switch section is made to perform the gating operation at a speed higher than the speed of gating by a single gate switch by applying drive current a current difference for which is smaller than a current difference for drive current applied if the single gate switch is placed on each path in the optical packet switch section along which the optical packets are transmitted to the gate switches multistage-connected on the paths along which the optical packets are transmitted.

* * * * *